(12) United States Patent
Kim et al.

(10) Patent No.: US 12,452,875 B2
(45) Date of Patent: Oct. 21, 2025

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Seonwook Kim, Seoul (KR); Suckchel Yang, Seoul (KR); Daesung Hwang, Seoul (KR); Duckhyun Bae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 321 days.

(21) Appl. No.: 17/915,565

(22) PCT Filed: Apr. 6, 2021

(86) PCT No.: PCT/KR2021/004285
§ 371 (c)(1),
(2) Date: Sep. 29, 2022

(87) PCT Pub. No.: WO2021/206422
PCT Pub. Date: Oct. 14, 2021

(65) Prior Publication Data
US 2023/0144002 A1  May 11, 2023

(30) Foreign Application Priority Data
Apr. 6, 2020 (KR) .................. 10-2020-0041750

(51) Int. Cl.
*H04W 72/23* (2023.01)
*H04L 5/00* (2006.01)
*H04W 72/1273* (2023.01)

(52) U.S. Cl.
CPC ........... *H04W 72/23* (2023.01); *H04L 5/0053* (2013.01); *H04W 72/1273* (2013.01)

(58) Field of Classification Search
CPC .. H04W 72/1273; H04W 72/23; H04L 5/0053
USPC ......................................... 370/329
See application file for complete search history.

(56) References Cited

U.S. PATENT DOCUMENTS 10,165,582 B2  12/2018 Papasakellariou
12,185,326 B2 * 12/2024 Liu ...................... H04W 72/23
(Continued)

FOREIGN PATENT DOCUMENTS

KR  20190112662 A  10/2019
KR  10-2019-0129790 A  11/2019
(Continued)

OTHER PUBLICATIONS

Huawei, HiSilicon, "Correction on PDCCH selection among different QCL-TypeD property", [Draft] Change Request, 3GPP TSG RAN WG1 Meeting #96, Feb. 25-Mar. 1, 2019, R1-1903690.
(Continued)

*Primary Examiner* — Peter G Solinsky
(74) *Attorney, Agent, or Firm* — BRYAN CAVE LEIGHTON PAISNER LLP

(57) ABSTRACT

The present disclosure relates to a wireless communication system and, specifically, to a method and a device therefor, the method comprising the steps of: monitoring a plurality of PDCCH candidate sets within an SS set on a scheduling cell, to detect a PDCCH including scheduling information on at least one cell, wherein each PDCCH candidate set is associated with only one corresponding cell index, and if the at least one cell corresponds to a plurality of cells, PDCCH candidates for the PDCCH are configured in a PDCCH candidate set associated with a smallest cell index among cell indexes of the plurality of cells; and performing data
(Continued)

communication on the at least one cell on the basis of the PDCCH.

5 Claims, 17 Drawing Sheets

(56) References Cited

U.S. PATENT DOCUMENTS

| | | | |
|---|---|---|---|
| 2019/0098613 A1 | 3/2019 | Chen et al. | |
| 2019/0124627 A1 | 4/2019 | Park et al. | |
| 2022/0191912 A1* | 6/2022 | Liu | H04W 72/23 |
| 2024/0314689 A1* | 9/2024 | Agiwal | H04W 72/0453 |

FOREIGN PATENT DOCUMENTS

| | | |
|---|---|---|
| KR | 1020190129011 A | 11/2019 |
| KR | 102153971 B1 | 9/2020 |

OTHER PUBLICATIONS

Samsung, "Cross-carrier Scheduling with Different Numerologies," 3GPP TSG RAN WG1 #96bis, R1-1904399, 5 pages, Apr. 2019.

Qualcomm Incorporated, "PDCCH Enhancements for eURLLC," 3GPP TTG-RAN WG1 Meeting #98b, R1-1911118, 14 pages, Oct. 2019.

LG Electronic, Samsung, "WF on Cross-carrier scheduling in TDD", 3GPP TSG RAN WG1 Meeting 91, R1-1721221, Reno, USA, Nov. 27-Dec. 1, 2017.

NTT COCOMO, Inc., "Cross-carrier scheduling with different numerologies", 3GPP TSG RAN WG1 Ad-Hoc Meeting 1901, R1-1900984, Taipei, Jan. 21-25, 2019.

Samsung, "Remaining issues for cross-carrier scheduling with different numerology", 3GPP TSG RAN WG1#100-e, R1-2000646, e-Meeting, Feb. 24-Mar. 6, 2020.

Nokia, Nokia Shanghai Bell, "Correction to cross-carrier scheduling configuration", 3GPP TSG-RAN WG2 Meeting #106, R2-1906173, Reno USA, May 13-17, 2019.

* cited by examiner

Non - interleaved CCE - to - REG mapping

METHOD AND APPARATUS FOR TRANSMITTING AND RECEIVING WIRELESS SIGNAL IN WIRELESS COMMUNICATION SYSTEM

This application is the National Stage filing under 35 U.S.C. 371 of International Application No. PCT/KR2021/004285 filed on Apr. 6, 2021, which claims priority to Korean Patent Application No. 10-2020-0041750 filed on Apr. 6, 2020, the contents of which are all hereby incorporated by reference herein in their entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solutions

In accordance with a first aspect of the present disclosure, a method for performing communication by a user equipment (UE) in a wireless communication system may include monitoring a plurality of physical downlink control channel (PDCCH) candidate sets within a search space (SS) set on a scheduling cell, thereby detecting a PDCCH including scheduling information for at least one cell; and performing data communication on the at least one cell based on the PDCCH. Each PDCCH candidate set may be associated with only one corresponding cell index. When the at least one cell corresponds to a plurality of cells, PDCCH candidates for the PDCCH may be configured in a PDCCH candidate set associated with a minimum cell index from among cell indexes of the plurality of cells.

In accordance with a second aspect of the present disclosure, a user equipment (UE) for use in a wireless communication system may include at least one radio frequency (RF) unit; at least one processor; and at least one computer memory operatively connected to the at least one processor, and configured to allow the at least one processor to perform specific operations when executed. The specific operations include: monitoring a plurality of physical downlink control channel (PDCCH) candidate sets within a search space (SS) set on a scheduling cell, thereby detecting a PDCCH including scheduling information for at least one cell; and performing data communication on the at least one cell based on the PDCCH. Each PDCCH candidate set may be associated with only one corresponding cell index. When the at least one cell corresponds to a plurality of cells, PDCCH candidates for the PDCCH are configured in a PDCCH candidate set associated with a minimum cell index from among cell indexes of the plurality of cells.

In accordance with a third aspect of the present disclosure, an apparatus for a user equipment (UE) may include at least one processor; and at least one computer memory operatively connected to the at least one processor, and configured to allow the at least one processor to perform specific operations when executed. The specific operations include: monitoring a plurality of physical downlink control channel (PDCCH) candidate sets within a search space (SS) set on a scheduling cell, thereby detecting a PDCCH including scheduling information for at least one cell; and performing data communication on the at least one cell, based on the PDCCH. Each PDCCH candidate set may be associated with only one corresponding cell index. When the at least one cell corresponds to a plurality of cells, PDCCH candidates for the PDCCH may be configured in a PDCCH candidate set associated with a minimum cell index from among cell indexes of the plurality of cells.

In accordance with a fourth aspect of the present disclosure, a computer-readable storage medium configured to store at least one computer program that allows, when executed, at least one processor to perform specific operations may include performing the specific operations. The specific operations include: monitoring a plurality of physical downlink control channel (PDCCH) candidate sets within a search space (SS) set on a scheduling cell, thereby detecting a PDCCH including scheduling information for at least one cell; and performing data communication on the at least one cell, based on the PDCCH. Each PDCCH candidate set may be associated with only one corresponding cell index. When the at least one cell corresponds to a plurality of cells, PDCCH candidates for the PDCCH may be configured in a PDCCH candidate set associated with a minimum cell index from among cell indexes of the plurality of cells.

In accordance with a fifth aspect of the present disclosure, a method for performing communication by a base station (BS) in a wireless communication system may include transmitting a physical downlink control channel (PDCCH) including scheduling information for at least one cell through a plurality of physical downlink control channel (PDCCH) candidate sets within a search space (SS) set on a scheduling cell; and performing data communication on the at least one cell based on the PDCCH. Each PDCCH candidate set may be associated with one corresponding cell index. When the at least one cell corresponds to a plurality of cells, PDCCH candidates for the PDCCH may be configured in a PDCCH candidate set associated with a minimum cell index from among cell indexes of the plurality of cells.

In accordance with a sixth aspect of the present disclosure, a base station (BS) for use in a wireless communication system may include at least one radio frequency (RF) unit; at least one processor; and at least one computer memory operatively connected to the at least one processor, and configured to allow the at least one processor to perform specific operations when executed. The specific operations may include: transmitting a physical downlink control channel (PDCCH) including scheduling information for at least one cell through a plurality of physical downlink control channel (PDCCH) candidate sets within a search space (SS) set on a scheduling cell; and performing data communication on the at least one cell based on the PDCCH. Each PDCCH candidate set may be associated with one corresponding cell index. When the at least one cell corresponds to a plurality of cells, PDCCH candidates for the PDCCH may be configured in a PDCCH candidate set associated with a minimum cell index from among cell indexes of the plurality of cells.

Preferably, each cell index corresponds to at least one carrier indicator (CI) value, and each PDCCH candidate set may be configured based on a carrier indicator (CI) value corresponding to only one cell index.

Preferably, scheduling information of the PDCCH may include a first carrier indicator (CI) value, wherein the first CI value corresponds to one cell index (1) or corresponds to a plurality of cell indices (2).

Preferably, based on the first CI value corresponding to the plurality of cell indices, PDCCH candidates for the PDCCH may be configured in a PDCCH candidate set linked to a carrier indicator (CI) value corresponding to only a minimum cell index from among the plurality of cell indices among a plurality of preconfigured CI values.

Preferably, each of the PDCCH candidate sets may be configured on control channel elements (CCEs) contained in a control resource set (CORESET), wherein a start CCE index of each PDCCH candidate set is determined based on a carrier indicator (CI) value.

Advantageous Effects

According to the present disclosure, wireless signal transmission and reception may be efficiently performed in a wireless communication system.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

MODE FOR DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
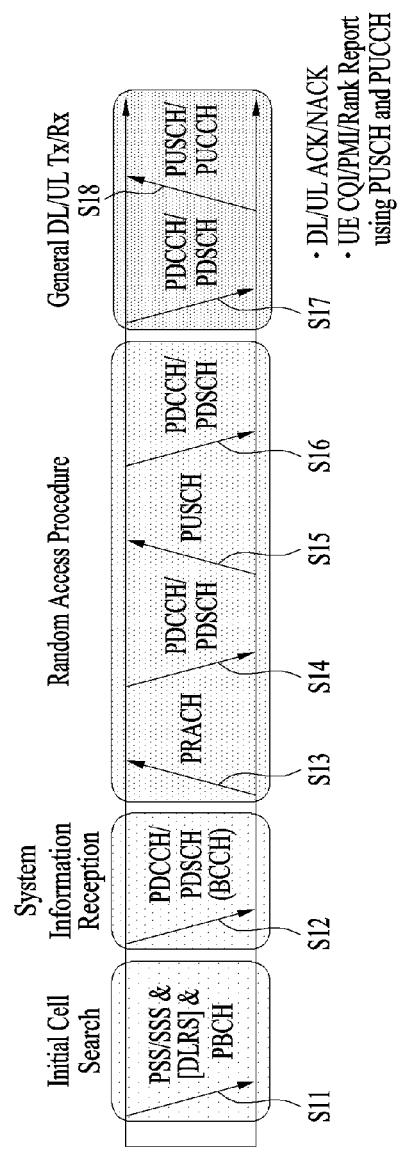
FIG. 1 illustrates physical channels used in a 3rd generation partnership project (3GPP) system, which is an example of wireless communication systems, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
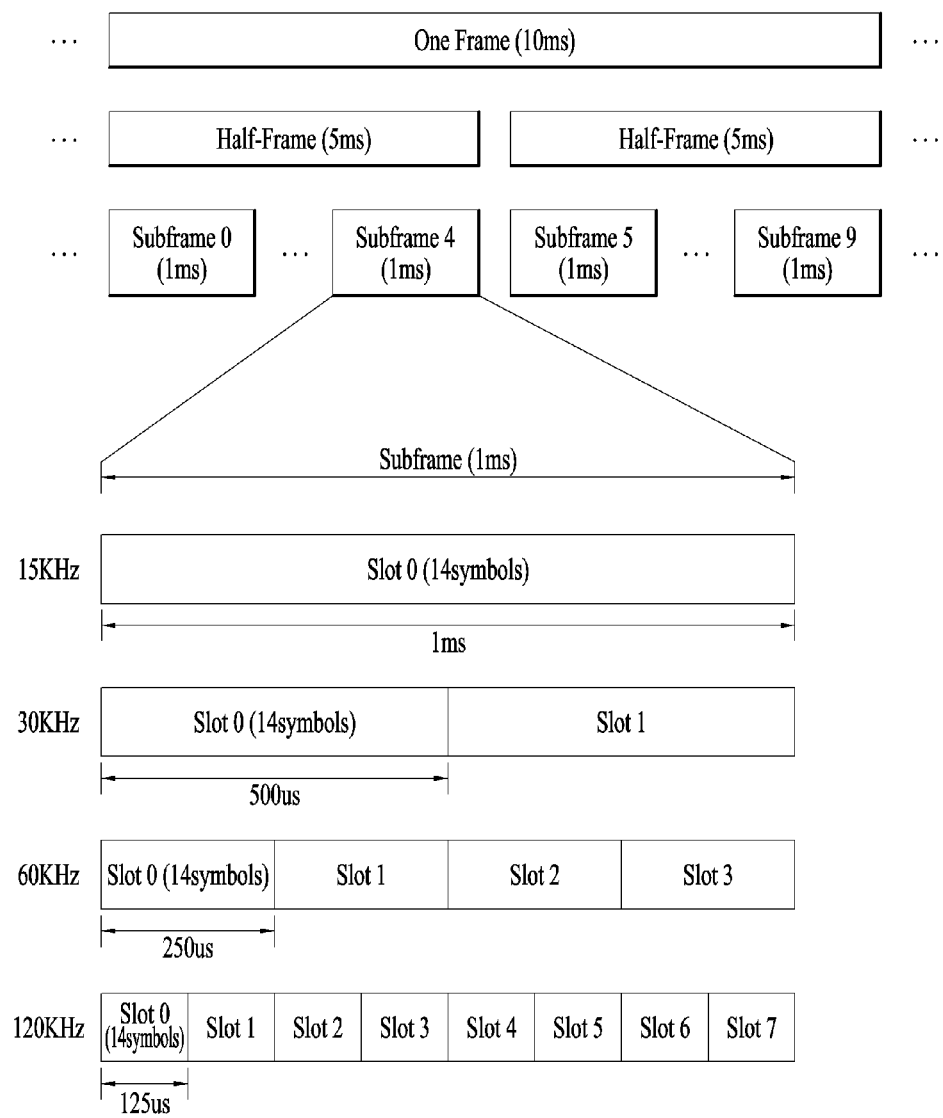
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-01-DM) symbol).

Figure 3:
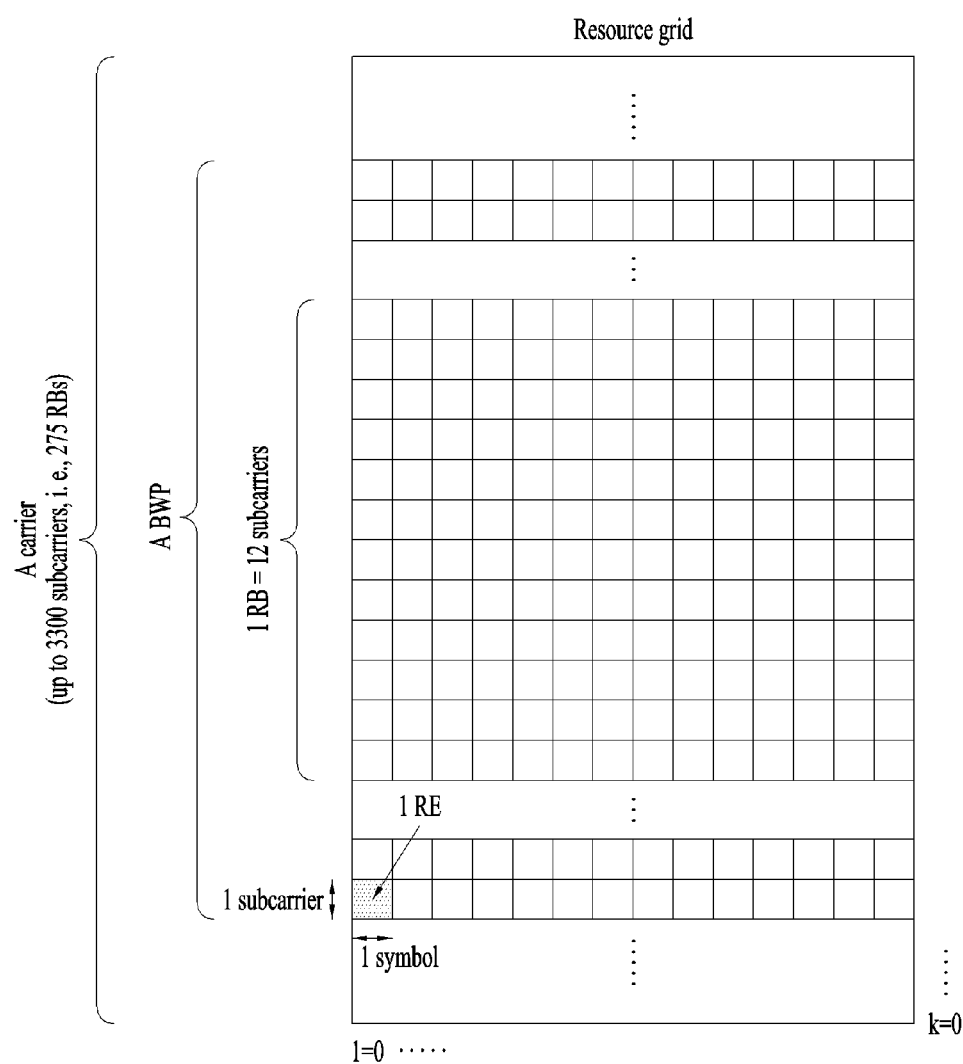
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
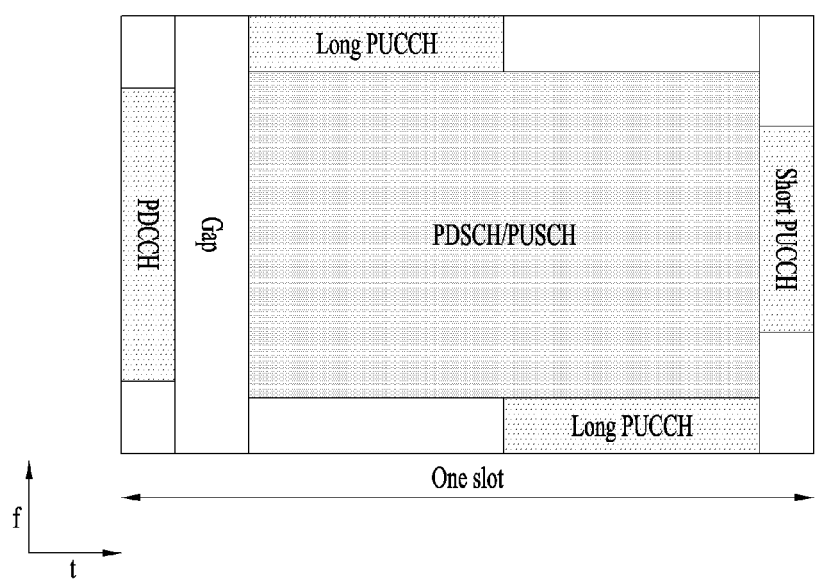
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
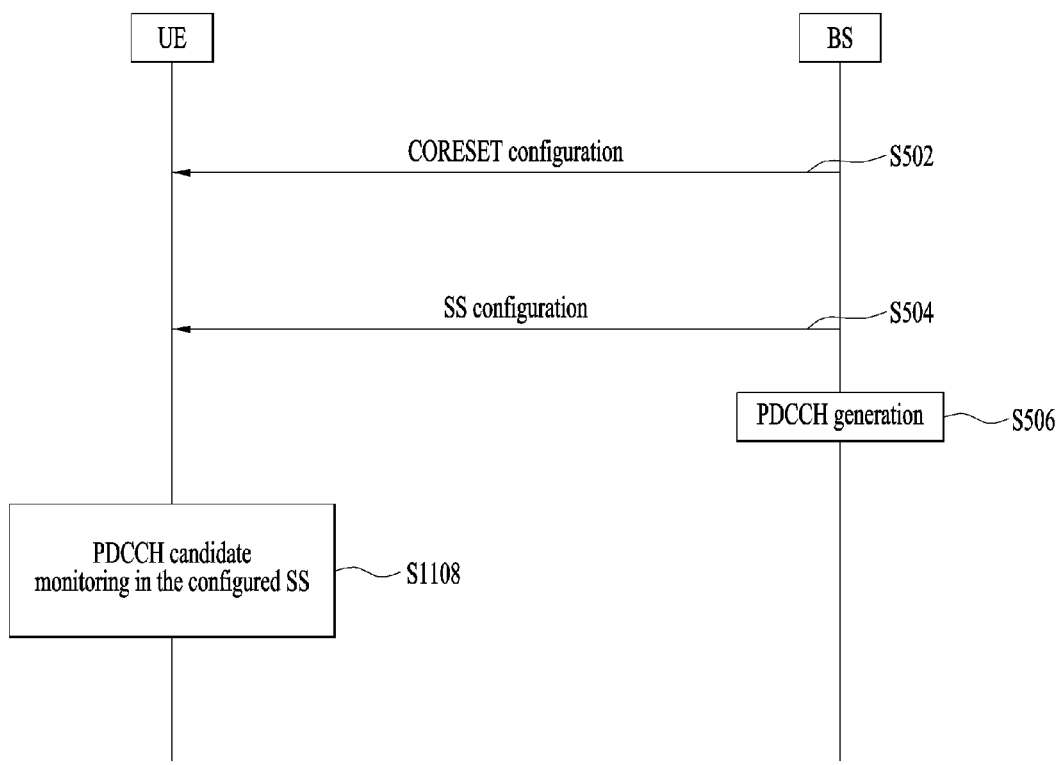
FIG. 5 is a flowchart illustrating a method for transmitting and receiving a physical downlink control channel (PDCCH).

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, the UE-specific RRC signaling may include various types of signaling such as an RRC setup message, and/or BWP configuration information. Specifically, a CORSET configuration may include the following information/fields.

controlResourceSetId: indicates the ID of a CORESET.
frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
duration: indicates the time resources of the CORESET. Duration indicates the number of consecutive OFDM symbols included in the CORESET. Duration has a value of 1 to 3.
cce-REG-MappingType: indicates a control channel element (CCE)-REG mapping type. Interleaved and non-interleaved types are supported.
interleaverSize: indicates an interleaver size.
pdcch-DMRS-ScramblingID: indicates a value used for PDCCH DMRS initialization. When pdcch-DMRS-ScramblingID is not included, the physical cell ID of a serving cell is used.
precoderGranularity: indicates a precoder granularity in the frequency domain.
reg-BundleSize: indicates an REG bundle size.
tci-PresentInDCI: indicates whether a transmission configuration index (TCI) field is included in DL-related DCI.
tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
controlResourceSetId: indicates a CORESET associated with the SS.
monitoringSlotPeriodicityAndOffset: indicates a periodicity (in slots) and offset (in slots) for PDCCH monitoring.
monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
nrofCandidates: indicates the number of PDCCH candidates (one of values 0, 1, 2, 3, 4, 5, 6, and 8) for each AL where AL={1, 2, 4, 8, 16}.
searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |

TABLE 3-continued

| Type | Search Space | RNTI | Use Case |
|---|---|---|---|
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The CCE to REG (or CCE-REG) mapping type may be set to either a non-interleaved CCE-REG mapping type or an interleaved CCE-REG mapping type.

Non-interleaved CCE-REG mapping type (or Localized mapping type)(see FIG. 5): In the non-interleaved CCE-REG mapping type, one REG bundle is composed of 6 REGs for a given CCE, and all REGs for the given CCE may be consecutive to each other. One REG bundle may correspond to one CCE.

Figure 6:
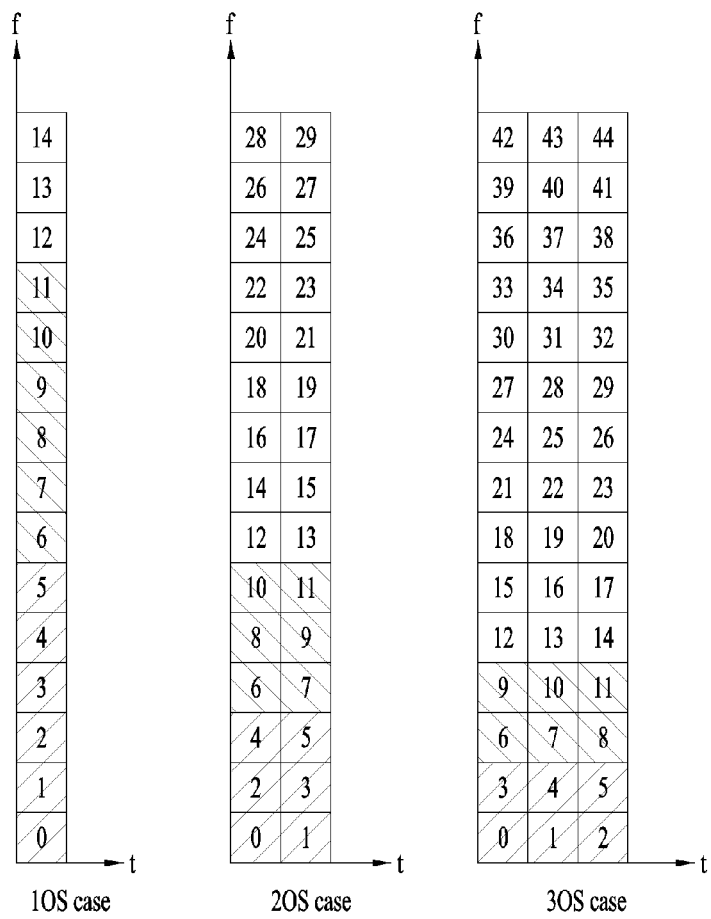
FIGS. 6 and 7 are diagrams illustrating examples of a control resource set (CORESET) structure.
Figure 7:
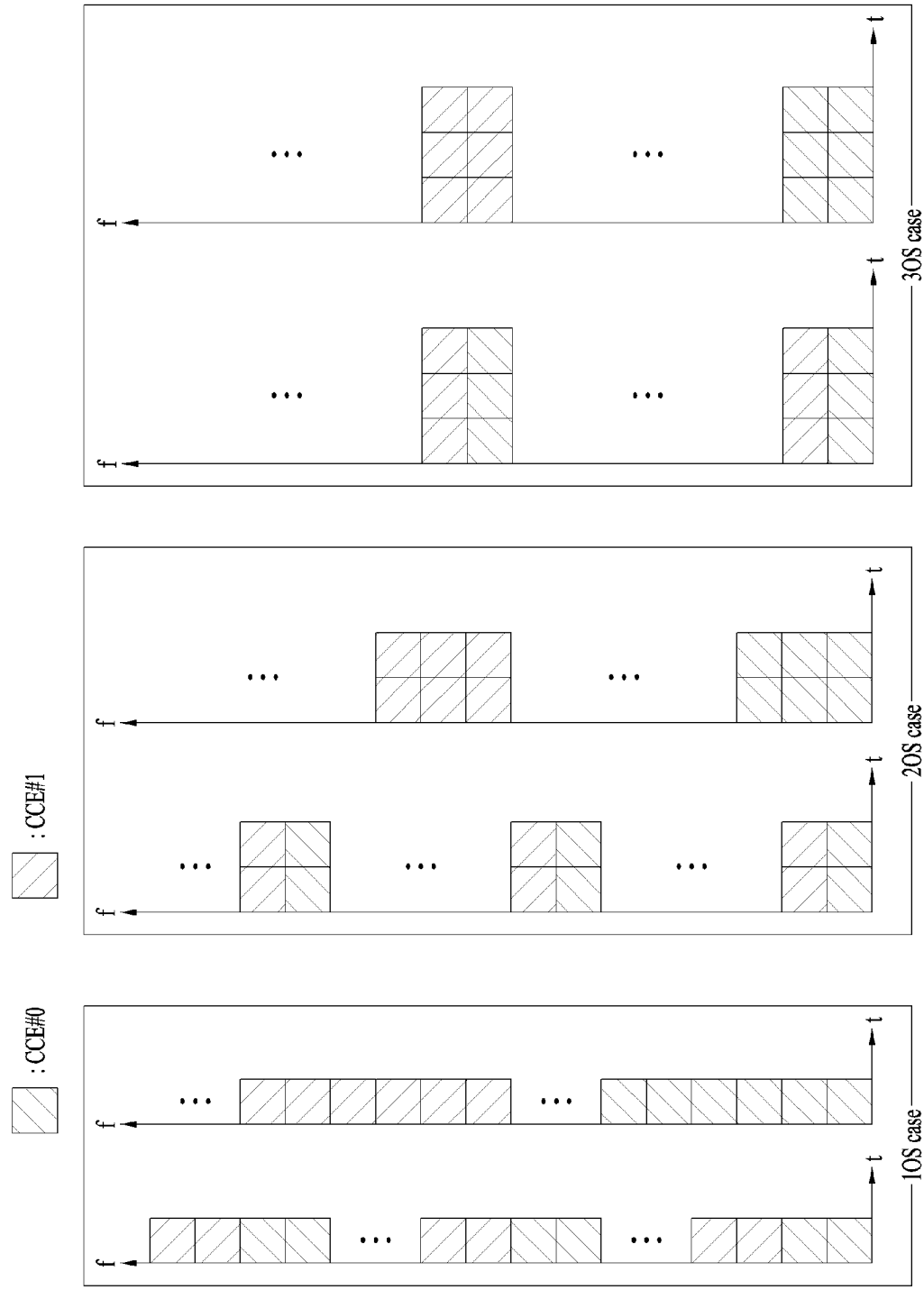

Interleaved CCE-REG mapping type (or Distributed mapping type) (see FIG. 6): One REG bundle is composed of 2, 3 or 6 REGs for a given CCE, and the REG bundle is interleaved in CORESET. The REG bundle in CORESET composed of 1 or 2 OFDM symbols consists of 2 or 6 REGs, and the REG bundle in CORESET composed of 3 OFDM symbols consists of 3 or 6 REGs. The size of the REG bundle is configured for each CORESET.

Equation 1 illustrates an example of resources constituting a PDCCH candidate in an SS set. Specifically, for the SS set (s) associated with CORESET (p), in the slot ($n^\mu_{s,f}$) of the active DL BWP of the serving cell (CI field value, $n_{CI}$), CCE indexes for an aggregation level (L) corresponding to the PDCCH candidate ($m_{s,nCI}$) of the SS can be represented by the following equation 1.

$$L \cdot \left\{ \left( Y_{p,n_{s,f}^\mu} + \left\lfloor \frac{m_{s,nCI} \cdot N_{CCE,p}}{L \cdot M^{(L)}_{s,max}} \right\rfloor + n_{CI} \right) \mod \lfloor N_{CCE,p}/L \rfloor \right\} + i \quad \text{[Equation 1]}$$

For CSS, $Y_{p,n_{s,f}^\mu}$ may be set to zero (i.e., $Y_{p,n_{s,f}^\mu}=0$).

For USS, $Y_{p,n_{s,f}^\mu}$ may be set to $(A_p \cdot Y_{p,n_{s,f}-1^\mu}) \mod D$ (i.e., $Y_{p,n_{s,f}^\mu}=(A_p \cdot Y_{p,n_{s,f}-1^\mu}) \mod D$), $Y_{p,-1}=N_{RNTI}\ne 0$ may be set, $A_p=39827$ for p mod3=0 may be set, $A_p=39829$ for p mod 3=1 may be set, $A_p=39839$ for p mod 3=2 may be set, and D may be set to 65537 (i.e., D=65537).

i=0, . . . , L−1 may be set.

$N_{CCE,p}$ denotes the number of CCEs in CORESET (p) (where, $0\sim N_{CCE,p}-1$).

$n_{CI}$ denotes a CI value of a scheduled cell. When a PDCCH candidate in the CSS includes the CI field, $n_{CI}$ may be set to zero ($n_{CI}=0$).

$m_{s,nCI}=0$, . . . , $M^{(L)}_{s,nCI}-1$ may be set. $M^{(L)}_{s,nCI}$ denotes the number of PDCCH candidates configured to be monitored by the UE for the aggregation level (L) in the SS set (s) for the serving cell corresponding to $n_{CI}$.

For CSS, $M^{(L)}_{s,max}=M^{(L)}_{s,0}$ may be set.

For USS, $M^{(L)}_{s,max}$ denotes a maximum value from among $M^{(L)}_{s,nCI}$ values for all no values configured for the aggregation level (L) in the SS set (s).

RNTI value denotes a C-RNTI value.

In Equation 1, NR may support a wider uplink/downlink (UL/DL) bandwidth by aggregating (or merging) a plurality of UL/DL carriers (i.e., carrier aggregation). It is possible to transmit/receive signals on a plurality of carriers through carrier aggregation (CA). When carrier aggregation (CA) is applied, each carrier (see FIG. 3) may be referred to as a component carrier (CC). CCs may be adjacent or non-adjacent to one another in the frequency domain. The bandwidth of each CC may be determined independently. Asymmetric carrier aggregation in which the number of UL CCs and the number of DL CCs are different is also possible. In NR, radio resources may be divided or managed by cells, and each cell may be composed of one DL CC and 0 to 2 UL CCs. For example, (i) a cell consists of only one DL CC, (ii) a cell consists of one DL CC and one UL CC, or (iii) a cell consists of one DL CC and 2 UL CCs (including one supplementary UL CC). Cells may be classified as follows. In this specification, a cell may be interpreted according to context, and may refer to, for example, a serving cell. In addition, unless otherwise described, the operations of the present specification may be applied to each serving cell.

PCell (Primary Cell): PCell is a cell operating at a primary component carrier (PCC) in which the UE in which carrier aggregation (CA) was configured may perform an initial connection establishment procedure or may initiate a connection re-establishment procedure. In case of dual connectivity (DC), PCell is a master cell group (MCG) cell operating at a primary frequency where the UE may perform the initial connection establishment procedure or may initiate the connection re-establishment procedure.

SCell (Secondary Cell): For the UE in which carrier aggregation (CA) is configured, SCell is a cell to which the UE providing radio resources to a special cell can additionally provide radio resources.

PSCell (Primary SCG Cell): In dual connectivity (DC), when RRC reconfiguration and a synchronization process are preformed, PSCell is a secondary cell group (SCG) cell in which the UE performs random access.

Special Cell (SpCell): In DC, SpCell represents a PCell of MCG or a PSCell of SCG. Otherwise (i.e., non-DC), SpCell represents the PCell.

Serving Cell (ServCell): ServCell denotes a cell that is configured in the UE having an RRC_CONNECTED state. When CA/DC is not configured, only one serving cell (i.e., PCell) exists. When CA/DC is configured, the serving cell represents a cell set including special cell(s) and all SCells.

On the other hand, control information may be configured to be transmitted and received only through a specific cell. For example, UCI may be transmitted only through a special cell (e.g., PCell). When the SCell (hereinafter, PUCCH-SCell) in which PUCCH transmission is allowed is configured, UCI may also be transmitted through the PUCCH-SCell. As another example, the BS may allocate a scheduling cell (set) to reduce PDCCH blinding decoding (BD) complexity at the UE side. For PDSCH reception and PUSCH transmission, the UE may perform PDCCH detection/decoding only in the scheduling cell. In addition, the BS may transmit a PDCCH only through the scheduling cell (set). For example, data (e.g., PDSCH, PUSCH) transmitted in one cell (or, active BWP within a cell) (hereinafter, a cell may be substituted with (active) BWP within the cell) may be scheduled through a PDCCH on the corresponding cell (i.e., Self-Carrier Scheduling, SCS). In addition, a PDCCH for downlink allocation may be transmitted in Cell #0 (i.e., a scheduling cell), and the corresponding PDSCH may be transmitted in Cell #2 (i.e., a scheduled cell) (i.e., Cross-Carrier Scheduling, CCS). The scheduling cell (set) may be configured in a UE-specific manner, a UE-group-specific manner, or a cell-specific manner. The scheduling cell may include a special cell (e.g., PCell).

For CCS, a carrier indicator field (CIF) may be used. The CIF may be semi-statically disabled or enabled by UE-specific (or UE-group-specific) higher layer (e.g., RRC) signaling. The CIF may be an X-bit field (e.g., x=3) in a PDCCH (i.e., DCI), and may be used to indicate the (serving) cell index of the scheduled cell.

CIF disabled: CIF is absent in the PDCCH. The PDCCH on the scheduling cell may allocate PDSCH/PUSCH resources on the same cell. That is, the scheduling cell is the same as the scheduled cell.

CIF enabled: CIF is present in the PDCCH. PDCCH on the scheduling cell may allocate PDSCH/PUSCH resources on one cell from among a plurality of cells using the CIF. The scheduling cell may be the same as or different from the scheduled cell. PDSCH/PUSCH may refer to PDSCH or PUSCH.

Figure 8:
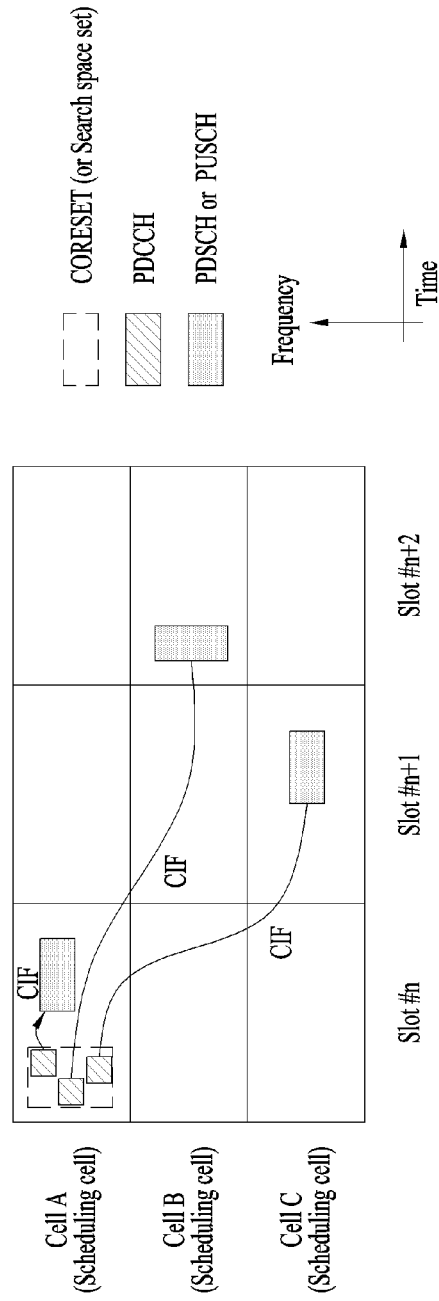
FIGS. 8 to 10 are diagrams illustrating examples of a scheduling method for use in a multi-carrier situation.

FIG. 8 illustrates an example of scheduling when multiple cells are aggregated (or merged). In FIG. 8, it is assumed that three cells are aggregated. When a CIF is disabled, only a PDCCH that schedules PDSCH/PUSCH for each cell can be transmitted within each cell (i.e., self-carrier scheduling, SCS). On the other hand, when a CIF is enabled by UE-specific (or UE-group-specific or cell-specific) higher layer signaling and the cell A is set to a scheduling set, not only a PDCCH scheduling PDSCH/PUSCH of the cell A, but also a PDCCH scheduling PDSCH/PUSCH of another cell (i.e., a scheduled cell) can be transmitted in the cell A (i.e., CCS). In this case, in the cells B and C, a PDCCH to be used for scheduling of the cells B and C may not be transmitted in the cells B and C.

Tables 5 and 6 illustrate examples of higher layer (e.g., RRC layer) information for CCS configuration. In the NR system, CCS configuration information may be provided for each cell through CrossCarrierSchedulingConfig information. SchedulingCellId may be used to identify a scheduling cell for a corresponding cell, and cif-InSchedulingCell may be used to identify/indicate a corresponding cell in the scheduling cell. The cif-InSchedulingCell may be referred to as a CIF value or a CI value. Accordingly, when CCS is configured, a CIF value may be configured in DCI (e.g., DCI format(s) 0_1, 0_2, 1_1, and/or 1_2) scheduling PDSCH or PUSCH on the scheduling cell, and the CIF value may have the value of 0 for a scheduling cell itself (hereinafter referred to as "own cell") and may have the values of 1 to 7 (configured by cif-InSchedulingCell) for another cell (i.e., CCS scheduled cell). In addition, the CIF value ($=n_{CI}$) may be used to determine the PDCCH candidate resources for the corresponding cell in the CORESET on the scheduling cell (see Equation 1).

TABLE 5

```
CrossCarrierSchedulingConfig ::= SEQUENCE {
   SchedulingCellInfo CHOICE {
      own      SEQUENCE { -- Cross carrier scheduling: scheduling cell
         cif-Presence BOOLEAN
      },
      other    SEQUENCE { -- Cross carrier scheduling: scheduled cell
         SchedulingCellId   ServCellIndex,
         cif-InSchedulingCell   INTEGER (1..7)
      }
   },
   ...
}
```

TABLE 6

CrossCarrierSchedulingConfig field descriptions cif-Presence: The field is used to indicate whether a carrier indicator field is present (value true) or not (value false) in PDCCH DCI formats. If cif-Presence is set to true, the CIF value indicating a grant or assignment for this cell is 0.
cif-InSchedulingCell: The field indicates the CIF value used in the scheduling cell to indicate a grant or assignment applicable for this cell.
other: Parameters for cross-carrier scheduling, i.e., a serving cell is scheduled by a PDCCH on another (scheduling) cell. The network configures this field only for SCells.
own: Parameters for self-scheduling, i.e., a serving cell is scheduled by its own PDCCH.
SchedulingCellId: Indicates which cell signals the downlink allocations and uplink grants, if applicable, for the concerned SCell. In case the UE is configured with DC, the scheduling cell is part of the same cell group (i.e. MCG or SCG) as the scheduled cell.

Figure 9:
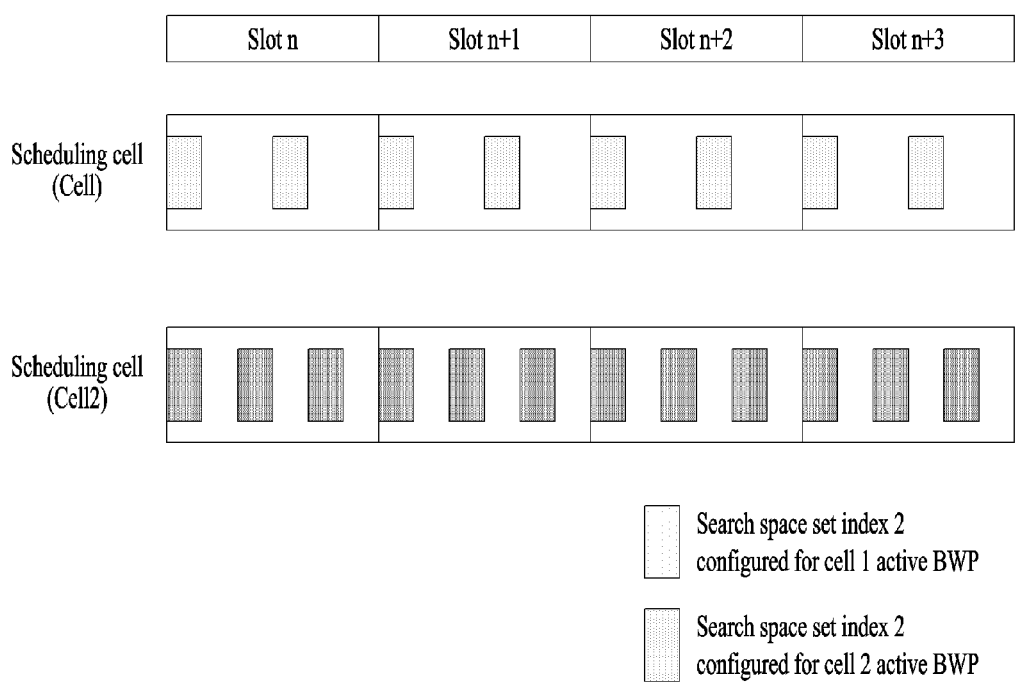

FIG. 9 illustrates an example of a CCS configuration method for use in the NR system. Referring to FIG. 9, PDCCH monitoring corresponding to an SS set configured for a scheduled cell may be performed at a PDCCH monitoring opportunity linked to an SS set having the same index as the corresponding SS set in the scheduling cell. PDCCH monitoring opportunity (e.g., time resources for monitoring a PDCCH) may be determined based on SS set configuration information, for example, a PDCCH monitoring period (e.g., a slot unit period), a PDCCH monitoring offset (e.g., a slot unit offset), and a PDCCH monitoring pattern within a slot (e.g., a first symbol position of CORESET within a slot). A PDCCH monitoring opportunity may be determined for each SS set (s) in CORESET (p). Ten or fewer SS sets may be associated with one CORESET, and each SS set may be identified by an SS set index. For example, if the scheduling cell for Cell 2 is set to Cell 1, monitoring for the DCI format linked to the SS set index #2 of Cell 2 may be performed at the PDCCH monitoring opportunity configured in the SS set index #2 of Cell 1. The number of PDCCH candidates for each AL may be configured through nrofCandidates (or nrofCandidates-SFI) from among higher layer configuration parameters for the SS set. The number of PDCCH candidates may follow a value configured in the (same index) SS set on the scheduled cell, not a value configured in the SS set on the scheduling cell.

Figure 10:
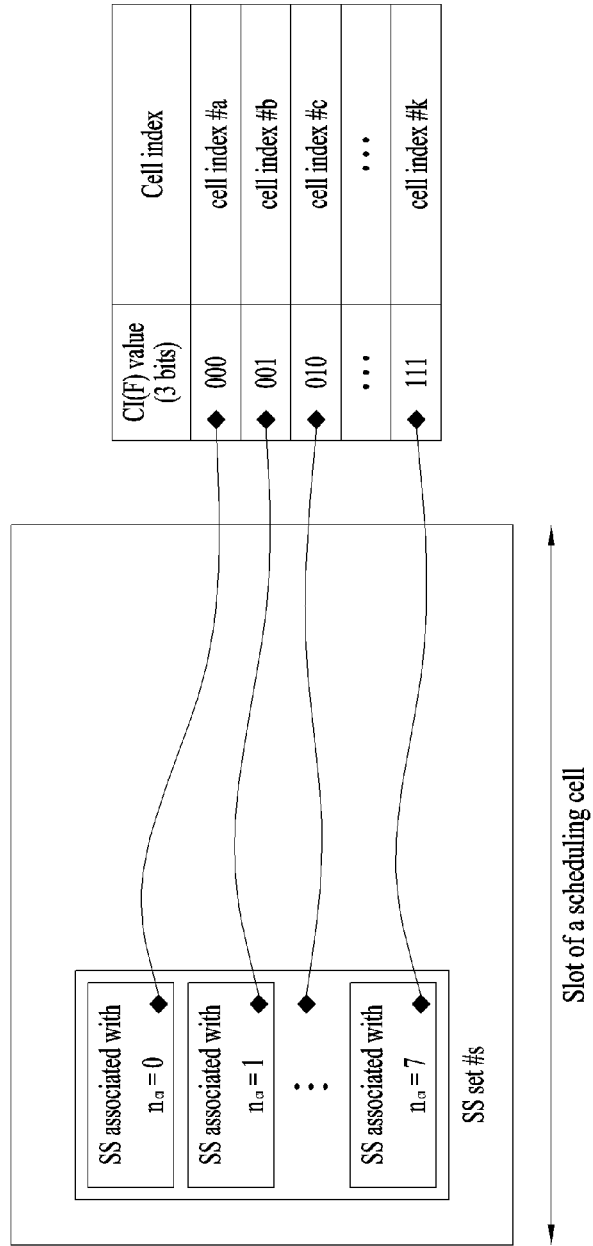

FIG. 10 illustrates an example of the SS set configuration for CCS. For example, referring to FIG. 9, the UE may monitor the PDCCH candidate set (or SS) corresponding to Cell 1 and the PDCCH candidate set (or SS) corresponding to Cell 2 within the SS set (#s) on the scheduling cell. In this case, each PDCCH candidate set (resources) (or SS) in the SS set may be determined based on the $n_{CI}$ value (see Equation 1). The $n_{CI}$ value may be used to determine the position of a start resource (e.g., CCE) of the PDCCH candidate set (or SS). The $n_{CI}$ value of the scheduled cell may be configured by cif-InSchedulingCell shown in Table 5. Although FIG. 10 shows that the respective PDCCH candidate sets (or SSs) do not overlap each other, some resources of the PDCCH candidate sets may actually overlap each other.

Embodiment: Multi-Cell Scheduling

In order to perform smooth immigration for the 5G NR service, for a base station (BS) to which the existing LTE service is provided, a scenario in which the 5G NR service of the corresponding BS can be enabled only by software upgrade may be considered. In this case, in a specific band, the BS may serve both LTE and NR systems. In the specific band, the existing LTE UE may receive the LTE service, and the 5G NR UE may receive the NR service. For example, the BS may have Carrier #1 (e.g., 1.8 GHz) in which the LTE and NR systems coexist/operate, and may have Carrier #2 (e.g., 3.5 GHz) in which only the NR system operates. NR UE capable of communicating with the BS can be simultaneously connected to the BS through Carrier #1 and Carrier #2. In this case, considering a wide coverage having low-frequency characteristics, it may be preferable that Carrier #1 be set to PCell. However, in Carrier #1, the BS may have to serve the LTE at the same time. In this case, serving the LTE (also called LTE service) means that an 'always-on' signal such as a cell-specific reference signal (CRS) may be transmitted, and PDCCH transmission may be reserved by a front side of every subframe. When NR is serviced under these conditions, there may be a disadvantage that the PDCCH transmission space through Carrier #1 is insufficient in size. In order to overcome this disadvantage, a method for transmitting a scheduling DCI for DL/UL data (e.g., PDSCH/PUSCH) to be transmitted from PCell in the SCell may be considered. In addition, a method for simultaneously scheduling not only DL (or UL) data to be transmitted from PCell but also DL (or UL) data to be transmitted from the corresponding SCell through one scheduling DCI to be transmitted from SCell may be considered.

Hereinafter, the present disclosure proposes, in a situation where the UE can receive 1) DCI scheduling DL (or UL) data to be transmitted from one cell on a specific cell and can receive 2) DCI scheduling DL (or UL) data to be transmitted from a plurality of cells on the specific cell, a method for distinguishing which one of methods 1) and 2) is associated with the received DCI. In addition, the present disclosure proposes a method for determining a PDCCH candidate (resource) for reception of DCI corresponding to 1) and/or 2).

Prior to description of the proposed method, abbreviations/terms used in the present disclosure are summarized as follows.

Cell: Cell may be interpreted according to context. For example, Cell may refer to a serving cell. The cell may include one DL CC and 0 to 2 UL CCs. For example, the cell may include one DL CC and one UL CC. Here, the cell may be substituted with an active BWP in the cell.

Single-cell scheduling: Single-cell scheduling may refer to scheduling of DL or UL data on one cell through one scheduling DCI transmitted from one cell.

Multi-cell scheduling: Multi-cell scheduling may refer to a scheduling operation in which DL or UL data on a plurality of cells (including the corresponding cell) are simultaneously scheduled through only one scheduling DCI transmitted from one cell. For example, multi-cell scheduling may refer to a scheduling operation in which DL (or UL) data on the corresponding cell and/or one or more other cells is scheduled through one scheduling DCI transmitted on a specific cell (e.g., any cell such as PCell, SCell, or the like).

Single-cell (scheduling) DCI: Single-cell scheduling DCI may refer to DCI (e.g., DCI formats 0_0, 0_1, 1_0, and 1_2) that performs scheduling of DL (or UL) data to be transmitted in one cell.

Multi-cell (scheduling) DCI: Multi-cell (scheduling) DCI may refer to DCI that performs scheduling of DL (or UL) data to be transmitted in a plurality of cells.

SS (Search Space): SS may refer to a set of PDCCH candidates to be monitored by the UE. In the present disclosure, the terms "SS" and "set of PDCCH candidates" may be used interchangeably. When the CCS is configured, a plurality of SSs (e.g., USSs) may be configured in the set of SSs (e.g., USS) on the scheduling cell, and each SS may be configured in association with the cell index (e.g., the $n_{CI}$ value) of the corresponding cell. For example, SS for Cell Index #n may refer to PDCCH candidates corresponding to the $n_{CI}$ values allocated to Cell Index #n. Resources (e.g., PDCCH candidates) constituting the SS (set) may be determined based on Equation 1.

DCI reception: In order to receive DCI, DCI may include an operation of monitoring (e.g., blind decoding BD) a plurality of PDCCH candidates.

PCell/(scheduling) SCell: PCell/(scheduling) SCell can be generalized to a scheduled cell or a scheduling cell. In addition, PCell may be substituted with SpCell.

CI value/$n_{CI}$: In the existing method, CI value/$n_{CI}$ may be used in the same manner. However, in order to facilitate description of the present disclosure, the CI value may indicate the value of the CIF belonging to DCI depending on the context, and $n_{CI}$ may indicate a value to be used for determining the PDCCH candidate in Equation 1.

Scheduling the cell: Scheduling the cell may refer to an operation of scheduling data transmission/reception on the cell. In addition, scheduling the cell index may refer to an operation for scheduling the cell of the corresponding cell index. Here, the data may include a PDSCH or a PUSCH.

1) Receiver (Entity A; e.g., UE):

[Method #1] A method of distinguishing whether DCI is set to DCI capable of performing single-cell scheduling only or DCI capable of performing multi-cell scheduling as well as the single-cell scheduling by setting different DCI formats and/or DCI payload sizes For example, a DCI format capable of performing multi-cell scheduling may be newly created (hereinafter referred to as a multi-cell DCI format), a multi-cell DCI format for scheduling a PUSCH may be defined as DCI format 0_3, and a multi-cell DCI format for scheduling a PDSCH may be defined as DCI format 1_3. In this case, the multi-cell DCI format may be defined/configured to schedule only a PUSCH (or PDSCH) for a plurality of cells, or may be defined/configured to schedule a PUSCH (or PDSCH) for a single cell as well as the plurality of cells. When the multi-cell DCI format is equal in size to the other existing DCI formats, the multi-cell DCI format may be bit-padded so that the multi-cell DCI format and the other DCI formats can be different in size from each other. For example, when DCI format 0_1 and DCI format 0_3 allocated to the UE are equal in DCI payload size to each other, the BS may perform one-bit bit-padding on DCI format 0_3 (or DCI format 0_1) so that DCI payload sizes of the DCI formats can be configured differently from each other. Since the payload size of the DCI format (hereinafter referred to as single-cell DCI format) (1) capable of performing only single-cell scheduling is different from the payload size of the multi-cell DCI format (2), the UE should monitor (e.g., blind decod) a PDCCH candidate (resource) corresponding to the single-cell DCI format (1) and a PDCCH candidate (resource) corresponding to the multi-cell DCI format (2) separately from each other.

Alternatively, an explicit field such as a first indication field is introduced into DCI, so that a first DCI (format) (i.e., single-cell DCI format) capable of performing only single-cell scheduling (defined in different formats) and a second DCI (format) capable of performing multi-cell scheduling as well as the single-cell scheduling can be distinguished from each other. For example, when the format indication field is set to '0' (or '1') (regardless of whether the DCI payload sizes of two formats are the same as or different from each other) in a process of detecting the DCI, the UE capable of receiving DCI format 0_1 and DCI format 0_3 may recognize that DCI format 0_1 was received. In addition, when the format indication field is set to '1' (or '0'), the UE may recognize that DCI format 0_3 was received. That is, the single-cell DCI format and the multi-cell DCI format may share a PDCCH candidate (resource) based on the same payload size, and the UE may interpret the information/field of DCI detected based on a value of the format indication field as single-cell scheduling information or multi-cell scheduling information.

Alternatively, a DCI (format) capable of performing only single-cell scheduling and a DCI (format) capable of further performing multi-cell scheduling may be distinguished from each other through introduction of a separate RNTI value. As an example, when RNTI obtained by DCI detection (regardless of whether the DCI payload sizes of two formats are the same as or different from each other) is set to C-RNTI, the UE capable of receiving DCI format 0_1 and DCI format 0_3 may recognize that DCI format 0_1 was received. In addition, when RNTI obtained by DCI detection is set to MCC-C-RNTI (i.e., RNTI separately configured for reception of DCI capable of further performing multi-cell scheduling), the UE capable of receiving DCI format 0_1 and DCI format 0_3 may recognize that DCI format 0_3 was received. That is, the single-cell DCI format and the multi-cell DCI format may share a PDCCH candidate (resource) based on the same payload size, and the UE may interpret the information/field of DCI detected based on the RNTI as single-cell scheduling information or multi-cell scheduling information.

[Method #2] In a method for indicating which cell(s) are to be scheduled (through DCI capable of performing multi-cell scheduling), a separate bit field may be added to the DCI so that the scheduling cells can be distinguished from each other by this separate bit field.

A separate bit field proposed by Method #2 may be added not only to DCI capable of performing multi-cell scheduling but also DCI capable of performing only single-cell scheduling.

For example, if the added separate bit field is set to '0' (or '1'), the CI field may be configured for single-cell scheduling purposes in the same manner as in the existing technology (see FIG. 8 and Table 5), and '1' (or, '0'), and if the added bit field is set to '1' (or '0'), the CI field may be configured for multi-cell scheduling purposes. To this end, as shown in Table 7, if the CI value is set to '000' (i.e., CI value=000), the cell index is set to Cell Index #1/2, and if the CI value is set to '001' (i.e., CI value=001), the cell index is set to Cell Index #1/3, so that such mapping relationship between the CI values and the cell indexes can be (additionally) configured through higher layer signaling. In this case, if the separate bit field value is set to '1' and the CI value is set to '001', the UE may recognize that the corresponding DCI is equal to a DCI for scheduling data to be transmitted from Cells #1 and #3. Accordingly, the UE may transmit data (e.g., PUSCH) or receive data (e.g., PDSCH) in the cells #1 and #3 based on the corresponding DCI.

TABLE 7

| CI value | Cell index |
| --- | --- |
| 000 | Cell index #1 and #2 |
| 001 | Cell index #1 and #3 |

At this time, if there is only one CI value (or a set of configured scheduling cells) configured for multi-cell scheduling purposes, the CI field corresponding to a state in which the added separate bit field indicates multi-cell scheduling may be 0 bits. In general, when the added separate bit field indicates single-cell scheduling, a 3-bit CI field may be configured in the same manner as in the existing technology. On the other hand, when the added separate bit field indicates multi-cell scheduling, the CI field having a bit-width corresponding to 'ceiling{log 2 (the number of CI values configured for multi-cell scheduling)}' or 'ceiling{log 2 (the number of the sets of the scheduling cells configured for multi-cell scheduling)} may be configured. For example, in a situation where DCI is for multi-cell scheduling and the configured cell indexes are the cell indexes #1 and #3 only, if the corresponding separate bit field value is set to '1' (i.e., for multi-cell scheduling purposes), even if the corresponding CI field does not explicitly exist, the UE may recognize that the corresponding DCI is equal to DCI for scheduling data to be transmitted from cells #1 and #3. Accordingly, the UE may transmit or receive data in cells #1 and #3. Specifically, the mapping relationship between the CI value and the cell index for multi-cell scheduling purposes may be (additionally) configured as shown in Table 7, and the mapping relationship between the CI value and the cell index for single-cell scheduling purposes may be configured as shown in Table 8.

TABLE 8

| CI value | Cell index |
| --- | --- |
| 000 | Cell index #1 (own cell) |
| 001 | Cell index #2 |
| 010 | Cell index #3 |

Combining Table 3 and Table 4 can be summarized as follows.

TABLE 9

| | Cell index (scheduled cell) | |
| --- | --- | --- |
| CI value | For multi-cell scheduling (e.g., bit field = 1) | For single-cell scheduling (e.g., bit field = 0) |
| 000 | 1$^{st}$ cell index set configured by a higher layer (e.g., cell index #1 and #2) | Own cell |
| 001 | 2$^{nd}$ cell index set configured by a higher layer (e.g., cell index #1 and #3) | Cell index #a |
| ... | ... | ... |
| 111 | 8$^{th}$ cell index set configured by a higher layer | Cell index #g |

Note:
see, Table 5 regarding cell index for single-cell scheduling

TABLE 10

| | Interpretation of CI value (for scheduled cell) | |
| --- | --- | --- |
| CI value | For multi-cell scheduling (e.g., bit field = 1) | For single-cell scheduling (e.g., bit field = 0) |
| 000 | mapped to 1$^{st}$ CI value set configured by a higher layer (e.g., 000 and 001) | 000 |
| 001 | mapped to 2$^{nd}$ CI value set configured by a higher layer (e.g., 000 and 101) | 001 |
| ... | ... | ... |
| 111 | mapped to 8$^{th}$ CI value set configured by a higher layer | 111 |

On the other hand, in the existing single-cell scheduling, one DCI may include only scheduling information for one cell, and a PDCCH candidate for the DCI may be determined based on the CI value of the scheduled cell in the SS set of the scheduling cell (See Equation 1). However, in multi-cell scheduling, since DCI corresponds to a plurality of scheduled cells, there is a problem as to how to determine a PDCCH candidate for the DCI. To this end, when the UE determines (e.g., see Equation 1) a PDCCH candidate corresponding to the CI value in a situation where DCI is used for multi-cell scheduling purposes (e.g., when the added bit-field is set to '1'), the UE may control Alt1) the CI value to be set to the no value without change so that the UE can determine a PDCCH candidate based on the resultant CI value, or the UE may control Alt2) all or some (e.g., a specific (or minimum) CI value) of CI values (e.g., see Table 8) configured for single-cell scheduling purposes to be set to the no value so that the UE can determine a PDCCH candidate based on the resultant CI value.

For example, as shown in the examples of Tables 7 and 8, according to Alt1, when the UE performs single-cell scheduling in the SS (i.e., a PDCCH candidate), the UE can expect DCI corresponding to the CI value of '000' ($n_{CI}$='000'), and when the UE performs multi-cell scheduling in the SS, the UE can expect DCI corresponding to the CI value of '000' ($n_{CI}$='000'). Accordingly, the UE can expect/monitor single-cell scheduling DCI for Cell Index #1 within the SS for Cell Index #1 (e.g., $n_{CI}$='000'), and can expect/monitor multi-cell scheduling DCI for Cell Indexes #1 and #2 (based on single-cell scheduling) only within the SS for Cell Index #1 (e.g., $n_{CI}$='000'). Therefore, in order to detect the multi-cell scheduling DCI for the cell indexes #1 and #2, the UE may monitor a PDCCH candidate only in the SS for the cell index #1 (e.g., $n_{CI}$='000') (based on single-cell scheduling). That is, the UE may omit the operation for detecting multi-cell scheduling DCI for the cell indexes #1 and #2 in the SS for the cell index #2 (e.g., $n_{CI}$='001') (based on single-cell scheduling). Alternatively, even if the multi-cell scheduling DCI for the cell indexes #1 and #2 is detected, the UE may ignore the detected DCI (e.g., X=2 or 3). According to Alt2 (i.e., a minimum CI value from among CI value(s) configured for single-cell scheduling purposes corresponding to the cell indexes associated with the CI value is set to no so that the PDCCH candidate is determined based on the $n_{CI}$ value), the UE may expect DCI corresponding to "CI value=000" in the SS (i.e., PDCCH candidate) corresponding to $n_{CI}$='000' during single-cell scheduling, and may expect DCI corresponding to "CI value=000 or 001" in the SS (i.e., PDCCH candidate) during multi-cell scheduling. This is because the CI value of '000' or '001' in multi-cell scheduling is associated with the cell index #1, and the CI value of '000' in single-cell scheduling corresponding to the cell index #1 is a minimum value. Accordingly, the UE can expect/monitor the single-cell scheduling DCI for the cell index #1 in the SS for the cell index #1 (e.g., $n_{CI}$='000'), and can expect/monitor the multi-cell scheduling DCI (based on single-cell scheduling) for the cell indexes #1/#2 or #1/#3 only in the SS for the cell index #1 (e.g., $n_{CI}$='000'). Accordingly, in order to detect multi-cell scheduling DCI for the cell indexes #1/#2 or #1/#3, the UE may monitor the PDCCH candidate only in the SS for the cell index #1 (e.g., $n_{CI}$='000') (based on the single-cell scheduling). That is, (based on single-cell scheduling), the UE may omit the operation for detecting the multi-cell scheduling DCI for the cell indexes #1 and #X in the SS for the cell indexes #2 and #3 (e.g., $n_{CI}$='001'/'010'). Alternatively, even if the multi-cell scheduling DCI for the cell indexes #1 and #X is detected, the UE may ignore the detected DCI (e.g., X=2 or 3).

As another example, if the mapping relationship between the CI value and the cell index is configured to be the same as that of the existing technology (see Table 8), and if the added separate bit field indicates single cell scheduling (e.g., '0'), the CI field may be interpreted in the same manner as in the legacy scheme (i.e., the existing scheme). If the added separate bit field indicates multi-cell scheduling (e.g., '1'), the UE may recognize that the own cell (or a specific cell index preset/defined in advance) as well as the cells corresponding to the cell index instructed by the CI field can be scheduled. In a situation where the CI value is configured as shown in Table 8, if the value of a separate bit field added to the detected DCI is set to '1' (i.e., indicating multi-cell scheduling) and if the CI value is set to '001', the UE may recognize that not only the cell index #2 linked to the CI value but also data to be transmitted from the cell index #1 are scheduled through the corresponding DCI.

[Method #2] The separate bit field of Method #2 may be replaced with a format indication field or a separate RNTI of Method #1. For example, without adding the bit field to DCI, according to the RNTI scrambled in the DCI, whether the DCI relates to single-cell scheduling or multi-cell scheduling can be distinguished so that the CI value in the DCI can be interpreted differently.

[Method #3] In a method for indicating which cell(s) are actually scheduled through DCI capable of performing multi-cell scheduling, a method for allowing specific state(s) of the existing carrier indication field to be connected to a plurality of cell indexes is as follows.

In the present method, some specific state(s) of the existing 3-bit CIF may be allowed to be connected/associated/mapped with a plurality of cell indexes. For example, as shown in Table 11, in a situation where the mapping relationship between the CI value and the cell index may be configured (through higher layer (e.g., RRC) signal), if the CI value of '011' is indicated through DCI, the UE can recognize that data to be transmitted from the cell index #1 and the cell index #2 is scheduled. Accordingly, the UE may transmit data (e.g., PUSCH) in the cells #1 and #2 based on the corresponding DCI, or may receive data (e.g., PDSCH) in the cells #1 and #2 based on the corresponding DCI.

TABLE 11

| CI value | Cell index |
|---|---|
| 000 | Cell index #1 (own cell) |
| 001 | Cell index #2 |
| 010 | Cell index #3 |
| 011 | Cell index #1 and #2 |
| 100 | Cell index #1 and #3 |

Tables 12 to 13 illustrate modified examples of Table 11.

TABLE 12

| CI value | Cell index (scheduled cell) | |
|---|---|---|
| 000 | Cell index #1 (own cell) | Common to single-/multi-cell scheduling |
| 001 | Cell index #2 | |
| 010 | Cell index #3 | |
| 011 | $1^{st}$ cell index set configured by a higher layer (e.g., cell index #1 and #2) | Dedicated to multi-cell scheduling |
| 100 | $2^{nd}$ cell index set configured by a higher layer (e.g., cell index #1 and #3) | |
| ... | ... | ... |

TABLE 13

| CI value | Interpretation of CI value (for scheduled cell) | |
|---|---|---|
| 000 | 000 | Common to single-/multi-cell scheduling |
| 001 | 001 | |
| 010 | 010 | |
| 011 | mapped to $1^{st}$ CI value set configured by a higher layer (e.g., 000 and 001) | Dedicated to multi-cell scheduling |
| 100 | mapped to $2^{nd}$ CI value set configured by a higher layer (e.g., 000 and 101) | |
| ... | ... | ... |

In this case, when the UE determines a PDCCH candidate corresponding to the CI value (e.g., see Equation 1), Alt1) the UE may determine a PDCCH candidate by setting the CI value to the $n_{CI}$ value without change, and Alt2) the UE may determine all or some (e.g., a specific (or minimum) CI value) from among the CI values configured for single-cell scheduling purposes corresponding to the cell index(es) associated with the CI value, to be the $n_{CI}$ value, thereby deciding the PDCCH candidate. Specifically, when the mapping relationship between the CI value and the cell index is configured as shown in Table 11, the UE may expect DCI in which the CI value is set to '000', '011' or '100' in the SS corresponding to $n_{CI}$='000' according to the case of Alt2 (i.e., a minimum CI value from among CI values configured for single-cell scheduling purposes corresponding to the cell index(es) associated with the CI value is set to the $n_{CI}$ value so that a PDCCH candidate can be determined). This is because the CI value of '011' or '100' is associated with the cell index #1 and the CI value '000' corresponding to the cell index #1 is a minimum value. Accordingly, the UE can expect/monitor the single-cell scheduling DCI for the cell index #1 in the SS for the cell index #1 (e.g., $n_{CI}$='000'), and can expect/monitor multi-cell scheduling DCI for the cell indexes #1/#2 or #1/#3 only in the SS for the cell index #1 (e.g., $n_{CI}$='000') (based on the single-cell scheduling). Accordingly, in order to detect the multi-cell scheduling DSCI for the cell indexes #1/#2 or #1/#3, the UE may monitor a PDCCH candidate only in the SS for the cell index #1 (e.g., $n_{CI}$='000') (based on single-cell scheduling). That is, the UE may omit the operation for detecting multi-cell scheduling DCI for the cell indexes #1/#X in the SS for the cell indexes #2/#3 (e.g., $n_{CI}$='001'/'010') (based on single-cell scheduling). Alternatively, even if the multi-cell scheduling DCI for the cell indexes #1/#X is detected, the UE may ignore the detected DCI (e.g., X=2 or 3).

[Method #4] In a method for indicating which cell(s) are actually scheduled through DCI in which multi-cell scheduling is possible, a specific state of the existing CI field may be pre-configured/pre-defined for the purpose of indicating multi-CC scheduling. If the corresponding state is indicated, Method #4 indicates which one of cell indexes will be scheduled by a specific bit field contained in the same DCI.

For example, in a situation where a specific state of the existing 3-bit CI field (e.g., CI value='111'; or a CI value in which a cell index corresponding to the CI value is not configured in advance) for the purpose of indicating multi-CC scheduling, when the corresponding state is indicated, Method #4 can inform the UE of information about which one of cell indexes will actually be scheduled either using X bits (where X is a positive integer) of the corresponding DCI or using a specific field (e.g., a frequency domain resource allocation field and the like). For example, if the CI value set to '111' (CI value='111'), the UE can recognize which one of cell indexes will actually be scheduled using X (e.g., 2) bits located to follow the CI field in the corresponding DCI, the preset mapping relationship can be utilized as shown in Table 14. That is, when the CI value is set to '111' (CI value='111') and the following 2 bits are denoted by '01', the UE can recognize that the corresponding DCI performs scheduling of data to be transmitted/received on the cell indexes #1 and #3. Accordingly, the UE may transmit data (e.g., PUSCH) or receive data (e.g., PDSCH) in the cells #1 and #3 based on the corresponding DCI.

TABLE 14

| Following 2 bit information | Scheduling cell index |
| --- | --- |
| 00 | Cell index #1 and #2 |
| 01 | Cell index #1 and #3 |
| 10 | Cell index #1, #2, and #3 |
| 11 | Cell index #2 and 3 |

In this case, when the UE determines a PDCCH candidate corresponding to the CI value (e.g., see Equation 1), Alt1) the UE may determine a PDCCH candidate by setting the CI value to the $n_{CI}$ value without change, Alt2) the UE may determine a PDCCH candidate by allocating the no value to a function of the CI value and the X-bits information, and Alt3) the UE may determine all or some (e.g., a specific (or minimum) CI value) from among the CI values corresponding to the cell indexes associated with the CI value and the X-bits information, to be the no value, thereby deciding the PDCCH candidate.

For example, in a situation where the mapping relationship between the CI value and the cell index is configured as shown in Table 8 and X(=2)-bit (i.e., 2 bits) information is configured as shown in Table 14, according to Alt2, if the CI value is set to '111', the sum of the CI value and the 2-bit information may be configured as the no value. For example, the UE may expect DCI in which the CI value in the SS (i.e., a PDCCH candidate) corresponding to $n_{CI}$=8 is set to '111' (i.e., CI value='111') and the 2-bit information is set to '01'. According to the case of Alt3 (i.e., a minimum CI value from among CI values configured for single-cell scheduling purposes corresponding to the cell index(es) associated with the CI value is set to the $n_{CI}$ value so that a PDCCH candidate can be determined), the UE may expect DCI in which the CI value is set to '000' in the SS corresponding to $n_{CI}$='000' or may expect DCI in which the CI value is set to '111' (i.e., CI value='111') and the 2-bit information is set to '00', '01' or '10'. This is because the CI value of '111' and the 2-bit information of '00', '01' or '10' are associated with the cell index #1 and the CI value corresponding to the cell index #1 (based on single-cell scheduling) is a minimum value. Accordingly, the UE can expect/monitor the single-cell scheduling DCI for the cell index #1 in the SS for the cell index #1 (e.g., $n_{CI}$='000'), and can expect/monitor the multi-cell scheduling DCI for the cell indexes #1 and #X only in the SS for the cell index #1 (e.g., $n_{CI}$='000') (based on the single-cell scheduling) (e.g., X=2 and/or 3). Accordingly, in order to detect the multi-cell scheduling DSCI for the cell indexes #1 and #X, the UE may monitor a PDCCH candidate only in the SS for the cell index #1 (e.g., $n_{CI}$='000') (based on single-cell scheduling). That is, the UE may omit the operation for detecting multi-cell scheduling DCI for the cell indexes #1/#X in the SS for the cell indexes #2 and #3 (e.g., $n_{CI}$='001' or '010') (based on single-cell scheduling). Alternatively, even if the multi-cell scheduling DCI for the cell indexes #1/#X is detected, the UE may ignore the detected DCI.

[Method #5] In a method for indicating which cell(s) are actually scheduled through DCI in which multi-cell scheduling is possible, a method for indicating which cell index will be allocated through a bitmap can be used, and a detailed description thereof will be given below.

For example, in a situation where each of the cell indexes #1, #2 and #3 is mapped to 3 bits of the bitmap, when '101' is indicated, the UE may recognize that the corresponding DCI performs scheduling of data to be transmitted/received in the cell index #1 and the cell index #3. Accordingly, the UE may transmit data (e.g., PUSCH) or receive data (e.g., PDSCH) in the cells #1 and #3 based on the corresponding DCI. In this case, the cell index corresponding to each bit in the bitmap may be configured by higher layer signaling (e.g., RRC or MAC CE signaling). In this case, '000' may mean scheduling of the own cell (or self-carrier scheduling).

As another example, cell index(s) to be additionally scheduled other than the own cell may be indicated through the corresponding bitmap. For example, if the respective bits of the 2-bit bitmap correspond to the cell indexes #2 and #3 and are denoted by '00', the UE may recognize DCI that performs self-carrier scheduling corresponding to '00'. If the respective bits of in the 2-bit bitmap correspond to the cell indexes #2 and #3 and are denoted by '01', the UE may recognize DCI that performs scheduling of data to be transmitted/received in both the own cell and the cell index #2 corresponding to '01'. If the respective bits of in the 2-bit bitmap correspond to the cell indexes #2 and #3 and are denoted by '10', the UE may recognize DCI that performs scheduling of data to be transmitted/received in both the own cell and the cell index #3 corresponding to '10'. If the respective bits of in the 2-bit bitmap correspond to the cell indexes #2 and #3 and are denoted by '11', the UE may recognize DCI that performs scheduling of data to be transmitted/received in the own cell and the cell indexes #2 and #3 corresponding to '11'. Accordingly, the UE may transmit data (e.g., PUSCH) or receive data (e.g., PDSCH) in the cell #1, the cell #2, and/or the cell #3 based on the corresponding DCI.

In this case, when the UE determines a PDCCH candidate corresponding to the CI value (e.g., see Equation 1), the corresponding bitmap value is set to no without change so that the PDCCH candidate can be determined.

2) Transmitter (Entity B; e.g., BS)

[Method #1A] In Method #1A, different DCI formats and/or different DCI payload sizes are configured, information as to whether DCI is set to first DCI in which only single-cell scheduling is possible or is set to second DCI in which multi-cell scheduling is possible can be distinguished.

For example, a DCI format (hereinafter, a multi-cell DCI format) capable of performing multi-cell scheduling is newly created, a multi-cell DCI format for scheduling a PUSCH is defined as DCI format 0_3, and a multi-cell DCI format for scheduling a PDSCH is defined as DCI format 1_3. In this case, the multi-cell DCI format may be defined/configured to schedule only a PUSCH (or PDSCH) for a plurality of cells, or may be defined/configured to schedule a PUSCH (or PDSCH) for a single cell as well as the plurality of cells. When the multi-cell DCI format is equal in size to the existing other DCI format, the multi-cell DCI format is bit-padded to have a different size from other DCI formats. For example, when DCI format 0_1 and DCI format 0_3 allocated to the UE have the same DCI payload size, the BS may perform 1-bit bit-padding on the DCI format 0_3 (or DCI format 0_1) so that DCI payload sizes of the DCI formats may be configured differently from each other. Since the payload size of the DCI format 1 (hereinafter referred to as a single-cell DCI format) in which only the existing single-cell scheduling can be performed is different from the payload size of the multi-cell DCI format 2, the BS should construct PDCCH candidate (resources) corresponding to the single-cell DCI format (1) and the multi-cell DCI format (2) separately from each other.

Alternatively, an (explicit) field such as a format indication field is introduced into DCI, so that a DCI (format) (i.e., a single-cell DCI format) capable of performing only single-cell scheduling (defined in different formats) and a DCI (format) capable of performing multi-cell scheduling can be distinguished from each other. For example, when the BS capable of transmitting DCI format 0_1 and DCI format 0_3 transmits DCI format 0_1 (regardless of whether DCI payload sizes of two formats are the same or different from each other), the format indication field may be set to '0'(or '1'), and when the BS transmits DCI format 0_3, the format indication field may be set to '1'(or '0'). That is, the single-cell DCI format and the multi-cell DCI format may share a PDCCH candidate (resource) based on the same payload size, and the BS may determine the value of the format indication field differently depending on whether the information/field of DCI is configured with single-cell scheduling information or multi-cell scheduling information.

Alternatively, a DCI (format) capable of performing only single-cell scheduling and a DCI (format) capable of performing multi-cell scheduling may be distinguished from each other by introducing a separate RNTI value. For example, in a situation where the BS capable of transmitting DCI format 0_1 and DCI format 0_3 applies a C-RNTI to the corresponding DCI when transmitting DCI format 0_1 (regardless of whether the DCI payload sizes of two formats are the same or different from each other), if DCI format 0_3 is transmitted, MCC-C-RNTI (i.e., RNTI separately configured to receive DCI capable of further performing multi-cell scheduling) may be applied to the corresponding DCI. That is, the single-cell DCI format and the multi-cell DCI format may share a PDCCH candidate (resource) based on the same payload size, and the BS may apply the RNTI differently depending on whether the information/field of DCI is configured with single-cell scheduling information or multi-cell scheduling information.

[Method #2A] In a method for indicating which cell(s) are actually scheduled (through DCI capable of performing multi-cell scheduling), a separate bit field is added to DCI so that cells to be scheduled can be distinguished from each other.

A separate bit field proposed by Method #2A may be added not only to DCI capable of performing multi-cell scheduling, but also to DCI capable of performing single-cell scheduling.

For example, when the added separate bit field is '0' (or '1'), the CI field is configured for single-cell scheduling purposes in the same manner as in the existing technology (see FIG. 8 and Table 5). When the added separate bit field is '1' (or '0'), the CI field may be configured for multi-cell scheduling purposes. To this end, as shown in Table 7, when the CI value is set to '000' (CI value='000'), mapping of the cell indexes #1 and #2 is performed, and when the CI value is set to '001' (CI value='001'), mapping of the cell indexes #1 and #3 is performed, so that this mapping relationship may be (additionally) configured through higher layer signaling. In this case, if the separate bit field value is '1' and the CI value is '001', the BS may indicate that the corresponding DCI is set to DCI capable of scheduling data to be transmitted in the cells #1 and #3. Accordingly, the BS may transmit data (e.g., PDSCH) or receive data (e.g., PUSCH) in the cells #1 and #3 based on the corresponding DCI.

In this case, if there is only one CI value (or a set of the configured scheduling cells) configured for multi-cell scheduling, the corresponding CI field may be 0 bits when an added separate bit field indicates multi-cell scheduling. In summary, when the added separate bit field indicates single-cell scheduling, the 3-bit CI field may be configured as in the existing technology. On the other hand, when the added separate bit field indicates multi-cell scheduling, the CI field having a bit-width corresponding to 'ceiling{log 2 (the number of CI values configured for multi-cell scheduling)}' or 'ceiling{log 2 (the number of the sets of the scheduling cells configured for multi-cell scheduling)}' may be configured. For example, in a situation where DCI is for multi-cell scheduling and the configured cell indexes are the cell indexes #1 and #3 only, if the corresponding separate bit field value is set to '1' (i.e., for multi-cell scheduling purposes), even if the corresponding CI field does not explicitly exist, the BS may inform the UE of DCI indicating that the corresponding DCI is used for scheduling data to be transmitted in the cells #1 and #3. Accordingly, the BS may transmit or receive data in the cells #1 and #3. Specifically, the mapping relationship between the CI value and the cell index for multi-cell scheduling purposes may be (additionally) configured as shown in Table 7, and the mapping relationship between the CI value and the cell index for single-cell scheduling purposes may be configured as shown in Table 8.

On the other hand, in the existing single-cell scheduling, one DCI may include only scheduling information for one cell, and a PDCCH candidate for the DCI may be determined based on the CI value of the scheduled cell in the SS set of the scheduling cell (See Equation 1). However, in multi-cell scheduling, since DCI corresponds to a plurality of scheduled cells, there is a problem as to how to determine/construct a PDCCH candidate for the DCI. To this end, when the UE determines (e.g., see Equation 1) a PDCCH candidate corresponding to the CI value in a situation where DCI is used for multi-cell scheduling purposes (e.g., when the added bit-field is set to '1'), the UE may control Alt1) the CI value to be set to the $n_{CI}$ value without change so that the UE can determine a PDCCH candidate based on the resultant CI value, or the UE may control Alt2) all or some (e.g., a specific (or minimum) CI value) of CI values (e.g., see Table 8) configured for single-cell scheduling purposes to be set to the $n_{CI}$ value so that the UE can determine a PDCCH candidate based on the resultant CI value.

For example, as shown in the examples of Tables 7 and 8, according to Alt1, when the UE performs single-cell scheduling in the SS (i.e., a PDCCH candidate) corresponding to $nn_{CI}$='000', the BS may transmit DCI in which the CI value is set to '000' (i.e., CI value='000'), and when the UE performs multi-cell scheduling in the SS corresponding to $n_{CI}$='000', the BS may transmit DCI in which the CI value is set to '000' (i.e., CI value='000'). Accordingly, the BS can transmit single-cell scheduling DCI for Cell Index #1 within the SS for Cell Index #1 (e.g., $n_{CI}$='000'), and can transmit multi-cell scheduling DCI for Cell Indexes #1 and #2 (based on single-cell scheduling) only within the SS for Cell Index #1 (e.g., $n_{CI}$='000'). Therefore, in order to transmit the multi-cell scheduling DCI for the cell indexes #1 and #2, the BS may construct a PDCCH candidate only in the SS for the cell index #1 (e.g., $n_{CI}$='000') (based on single-cell scheduling). That is, the BS may omit the operation for transmitting multi-cell scheduling DCI for the cell indexes #1 and #2 in the SS for the cell index #2 (e.g., $n_{CI}$='001') (based on single-cell scheduling). According to Alt2 (i.e., a minimum CI value from among CI value(s) configured for single-cell scheduling purposes corresponding to the cell indexes associated with the CI value is set to no so that the PDCCH candidate is determined based on the $n_{CI}$ value), the BS may transmit DCI corresponding to "CI value=000" in the SS (i.e., PDCCH candidate) corresponding to $n_{CI}$='000' during single-cell scheduling, and may transmit DCI corresponding to "CI value=000 or 001" in the SS (i.e., PDCCH candidate) during multi-cell scheduling. This is because the CI value of '000' or '001' in multi-cell scheduling is associated with the cell index #1, and the CI value of '000' in single-cell scheduling corresponding to the cell index #1 is a minimum value. Accordingly, the BS can transmit the single-cell scheduling DCI for the cell index #1 in the SS for the cell index #1 (e.g., $n_{CI}$='000'), and can transmit the multi-cell scheduling DCI (based on single-cell scheduling) for the cell indexes #1/#2 or #1/#3 only in the SS for the cell index #1 (e.g., $n_{CI}$='000'). Accordingly, in order to transmit multi-cell scheduling DCI for the cell indexes #1/#2 or #1/#3, the BS may construct the PDCCH candidate only in the SS for the cell index #1 (e.g., $n_{CI}$='000') (based on the single-cell scheduling). That is, (based on single-cell scheduling), the BS may omit the operation for transmitting the multi-cell scheduling DCI for the cell indexes #1 and #X in the SS for the cell indexes #2 and #3 (e.g., $n_{CI}$='001' or '010').

As another example, if the mapping relationship between the CI value and the cell index is configured to be the same as that of the existing technology (see Table 8), and if the added separate bit field indicates single cell scheduling (e.g., '0'), the CI field may be interpreted in the same manner as in the legacy scheme (i.e., the existing scheme). If the added separate bit field indicates multi-cell scheduling (e.g., '1'), the BS may instruct that the own cell (or a specific cell index preset/defined in advance) as well as the cells corresponding to the cell index instructed by the CI field can be scheduled. In a situation where the CI value is configured as shown in Table 8, if the value of a separate bit field added to the detected DCI is set to '1' (i.e., indicating multi-cell scheduling) and if the CI value is set to '001', the BS may instruct that not only the cell index #2 linked to the CI value but also data to be transmitted from the cell index #1 are scheduled through the corresponding DCI.

[Method #2A] The separate bit field of Method #2A may be replaced with a format indication field or a separate RNTI of Method #1A. For example, without adding the bit field to DCI, according to the RNTI scrambled in the DCI, whether the DCI relates to single-cell scheduling or multi-cell scheduling can be distinguished so that the CI value in the DCI can be interpreted differently.

[Method #3A] In a method for indicating which cell(s) are actually scheduled through DCI capable of performing multi-cell scheduling, a method for allowing specific state(s) of the existing carrier indication field to be connected to a plurality of cell indexes is as follows.

In the present method, some specific state(s) of the existing 3-bit CIF may be allowed to be connected/associated/mapped with a plurality of cell indexes. For example, as shown in Table 11, in a situation where the mapping relationship between the CI value and the cell index may be configured (through higher layer (e.g., RRC) signal), if the CI value of '011' is indicated through DCI, the BS can instruct that data to be transmitted from the cell index #1 and the cell index #2 is scheduled. Accordingly, the BS may transmit data (e.g., PDSCH) in the cells #1 and #2 based on the corresponding DCI, or may receive data (e.g., PUSCH) in the cells #1 and #2 based on the corresponding DCI.

In this case, when the UE determines a PDCCH candidate corresponding to the CI value (e.g., see Equation 1), Alt1) the UE may determine a PDCCH candidate by setting the CI value to the $n_{CI}$ value without change, and Alt2) the UE may determine all or some (e.g., a specific (or minimum) CI value) from among the CI values configured for single-cell scheduling purposes corresponding to the cell index(es) associated with the CI value, to be the $n_{CI}$ value, thereby deciding the PDCCH candidate. Specifically, when the mapping relationship between the CI value and the cell index is configured as shown in Table 11, the BS may transmit DCI in which the CI value is set to '000', '011' or '100' in the SS corresponding to $n_{CI}$='000' according to the case of Alt2 (i.e., a minimum CI value from among CI values configured for single-cell scheduling purposes corresponding to the cell index(es) associated with the CI value is set to the $n_{CI}$ value so that a PDCCH candidate can be determined). This is because the CI value of '011' or '100' is associated with the cell index #1 and the CI value '000' corresponding to the cell index #1 is a minimum value. Accordingly, the BS can transmit the single-cell scheduling DCI for the cell index #1 in the SS for the cell index #1 (e.g., $n_{CI}$='000'), and can transmit multi-cell scheduling DCI for the cell indexes #1/#2 or #1/#3 only in the SS for the cell index #1 (e.g., $n_{CI}$='000') (based on the single-cell scheduling). Accordingly, in order to transmit the multi-cell scheduling DSCI for the cell indexes #1/#2 or #1/#3, the BS may construct a PDCCH candidate only in the SS for the cell index #1 (e.g., $n_{CI}$='000') (based on single-cell scheduling). That is, the BS may omit the operation for transmitting multi-cell scheduling DCI for the cell indexes #1/#X in the SS for the cell indexes #2/#3 (e.g., $n_{CI}$='001'/'010') (based on single-cell scheduling).

[Method #4A] In a method for indicating which cell(s) are actually scheduled through DCI in which multi-cell scheduling is possible, a specific state of the existing CI field may be pre-configured/pre-defined for the purpose of indicating multi-CC scheduling. If the corresponding state is indicated, Method #4 indicates which one of cell indexes will be scheduled by a specific bit field contained in the same DCI.

For example, in a situation where a specific state of the existing 3-bit CI field (e.g., CI value='111'; or a CI value in which a cell index corresponding to the CI value is not configured in advance) for the purpose of indicating multi-CC scheduling, when the corresponding state is indicated, Method #4 can indicate information about which one of cell indexes will actually be scheduled either using X bits (where X is a positive integer) of the corresponding DCI or using a specific field (e.g., a frequency domain resource allocation field and the like). For example, if the CI value set to '111' (CI value='111'), the BS can instruct which one of cell indexes will actually be scheduled using X (e.g., 2) bits located to follow the CI field in the corresponding DCI, the preset mapping relationship can be utilized as shown in Table 14. That is, when the CI value is set to '111' (CI value='111') and the following 2 bits are set to '01', the BS can instruct that the corresponding DCI performs scheduling of data to be transmitted/received on the cell indexes #1 and #3. Accordingly, the BS may transmit data (e.g., PDSCH) or receive data (e.g., PUSCH) in the cells #1 and #3 based on the corresponding DCI.

In this case, when the BS determines a PDCCH candidate corresponding to the CI value (e.g., see Equation 1), Alt1) the BS may construct a PDCCH candidate by setting the CI value to the $n_{CI}$ value without change, Alt2) the UE may construct a PDCCH candidate by allocating the $n_{CI}$ value to a function of the CI value and the X-bits information, and Alt3) the UE may construct all or some (e.g., a specific (or minimum) CI value) from among the CI values corresponding to the cell indexes associated with the CI value and the X-bits information, to be the no value, thereby deciding the PDCCH candidate.

For example, in a situation where the mapping relationship between the CI value and the cell index is configured as shown in Table 8 and X(=2)-bit (i.e., 2 bits) information is configured as shown in Table 14, according to Alt2, if the CI value is set to '111', the sum of the CI value and the 2-bit information may be configured as the no value. For example, the BS may transmit DCI in which the CI value in the SS (i.e., a PDCCH candidate) corresponding to $n_{CI}$=8 is set to '111' (i.e., CI value='111') and the 2-bit information is set to '01'. According to the case of Alt3 (i.e., a minimum CI value from among CI values configured for single-cell scheduling purposes corresponding to the cell index(es) associated with the CI value is set to the $n_{CI}$ value so that a PDCCH candidate can be determined), the BS may transmit DCI in which the CI value is set to '000' in the SS corresponding to $n_{CI}$='000' or may transmit DCI in which the CI value is set to '111' (i.e., CI value='111') and the 2-bit information is set to '00', '01' or '10'. This is because the CI value of '111' and the 2-bit information of '00', '01' or '10' are associated with the cell index #1 and the CI value corresponding to the cell index #1 (based on single-cell scheduling) is a minimum value. Accordingly, the BS can transmit the single-cell scheduling DCI for the cell index #1 in the SS for the cell index #1 (e.g., $n_{CI}$='000'), and can transmit the multi-cell scheduling DCI for the cell indexes #1/#X only in the SS for the cell index #1 (e.g., $n_{CI}$='000') (based on the single-cell scheduling) (e.g., X=2 and/or 3). Accordingly, in order to detect the multi-cell scheduling DCI for the cell indexes #1/#X, the BS may transmit a PDCCH candidate only in the SS for the cell index #1 (e.g., $n_{CI}$='000') (based on single-cell scheduling). That is, the UE may omit the operation for detecting multi-cell scheduling DCI for the cell indexes #1 and #X in the SS for the cell indexes #2 and #3 (e.g., $n_{CI}$='001' or '010') (based on single-cell scheduling).

[Method #5A] In a method for indicating which cell(s) are actually scheduled through DCI in which multi-cell scheduling is possible, a method for indicating which cell index will be allocated through a bitmap can be used, and a detailed description thereof will be given below.

For example, in a situation where each of the cell indexes #1, #2 and #3 is mapped to 3 bits of the bitmap, when '101' is indicated, the BS may instruct that the corresponding DCI performs scheduling of data to be transmitted/received in the cell index #1 and the cell index #3. Accordingly, the BS may transmit data (e.g., PDSCH) or receive data (e.g., PUSCH) in the cells #1 and #3 based on the corresponding DCI. In this case, the cell index corresponding to each bit in the bitmap may be configured by higher layer signaling (e.g., RRC or MAC CE signaling). In this case, '000' may mean scheduling of the own cell (or self-carrier scheduling).

As another example, cell index(es) to be additionally scheduled other than the own cell may be indicated through the corresponding bitmap. For example, if the respective bits of in the 2-bit bitmap correspond to the cell indexes #2 and #3 and are denoted by '00', the BS may inform the UE of DCI that performs self-carrier scheduling corresponding to '00'. If the respective bits of in the 2-bit bitmap correspond to the cell indexes #2 and #3 and are denoted by '01', the BS may inform the UE of DCI that performs scheduling of data to be transmitted/received in both the own cell and the cell index #2 corresponding to '01'. If the respective bits of in the 2-bit bitmap correspond to the cell indexes #2 and #3 and are denoted by '10', the BS may inform the UE of DCI that performs scheduling of data to be transmitted/received in both the own cell and the cell index #3 corresponding to '10'. If the respective bits of in the 2-bit bitmap correspond to the cell indexes #2 and #3 and are denoted by '11', the BS may inform the UE of DCI that performs scheduling of data to be transmitted/received in the own cell and the cell indexes #2 and #3 corresponding to '11'. Accordingly, the BS may transmit data (e.g., PDSCH) or receive data (e.g., PUSCH) in the cell #1, the cell #2, and/or the cell #3 based on the corresponding DCI.

In this case, when the UE determines a PDCCH candidate corresponding to the CI value (e.g., see Equation 1), the corresponding bitmap value is set to $n_{CI}$ without change so that the PDCCH candidate can be determined.

3) Receiver & Transmitter (Between Receiver and Transmitter)

Figure 11:
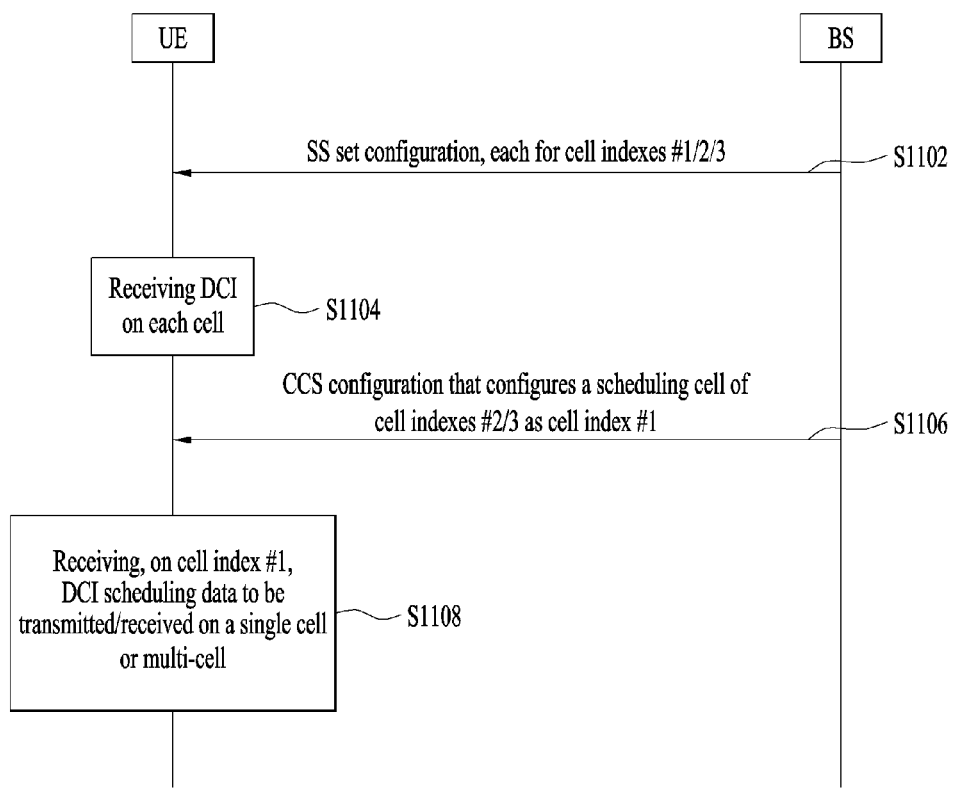
FIGS. 11 to 13 are diagrams illustrating examples of a scheduling method according to the embodiments of the present disclosure.

FIG. 11 illustrates an example of signal transmission according to the embodiments of the present disclosure. Referring to FIG. 11, when the cells #1, #2, and #3 are configured through CA, the UE may receive an SS set configuration for each cell (S1102). Thereafter, a PDCCH for scheduling data (e.g., PDSCH, PUSCH) on each cell may be received by the UE in the corresponding cell (S1104). On the other hand, upon receiving the CCS configuration in which the scheduling cell for the cells #2 and #3 is set to the cell #1 (S1106), the UE may receive DCI that schedules data to be transmitted/received on a single cell or multiple cells (multi-cell) on the cell #1 (S1108). In this case, the following operation may be performed according to the proposal of the present disclosure. The following methods may be combined with each other unless they do not contradict each other.

[Method #1]: In Method #1, information as to whether the corresponding DCI is set to single-cell scheduling DCI or multi-cell scheduling DCI can be distinguished through the DCI format and/or the DCI payload size.

[Method #2]: In Method #2, a separate CIF set is configured and received, information as to whether the DCI is single-cell scheduling DCI or multi-cell scheduling DCI can be distinguished through an indicator indicating the corresponding CIF set.

[Method #3]: In Method #3, the operation for allowing all or some states of the CIF field to be linked to/associated with the plurality of cells can be allowed so that information as to whether the corresponding DCI is a single-cell scheduling DCI or a multi-cell scheduling DCI can be distinguished.

[Method #4]: In Method #4, information as to whether the corresponding DCI is a single-cell scheduling DCI or a multi-cell scheduling DCI can be distinguished through a combination of a specific state of the CIF and other bit fields.

[Method #5]: In Method #5, information as to whether the corresponding DCI is single-cell scheduling DCI or multi-cell scheduling DCI can be distinguished by instructing a cell index through the bitmap.

According to the proposed methods, the BS may transmit a single-cell scheduling DCI and/or a multi-cell scheduling DCI to the UE, and may transmit data (e.g., PDSCH) in one or more cells based on information contained in the DCI or may transmit data (e.g., PUSCH) in one or more cells based on information contained in the DCI. In addition, the UE may receive single-cell scheduling DCI and/or multi-cell scheduling DCI from the BS, and may transmit data (e.g., PUSCH) or receive data (e.g., PDSCH) in one or more cells based on the DCI.

Figure 12:
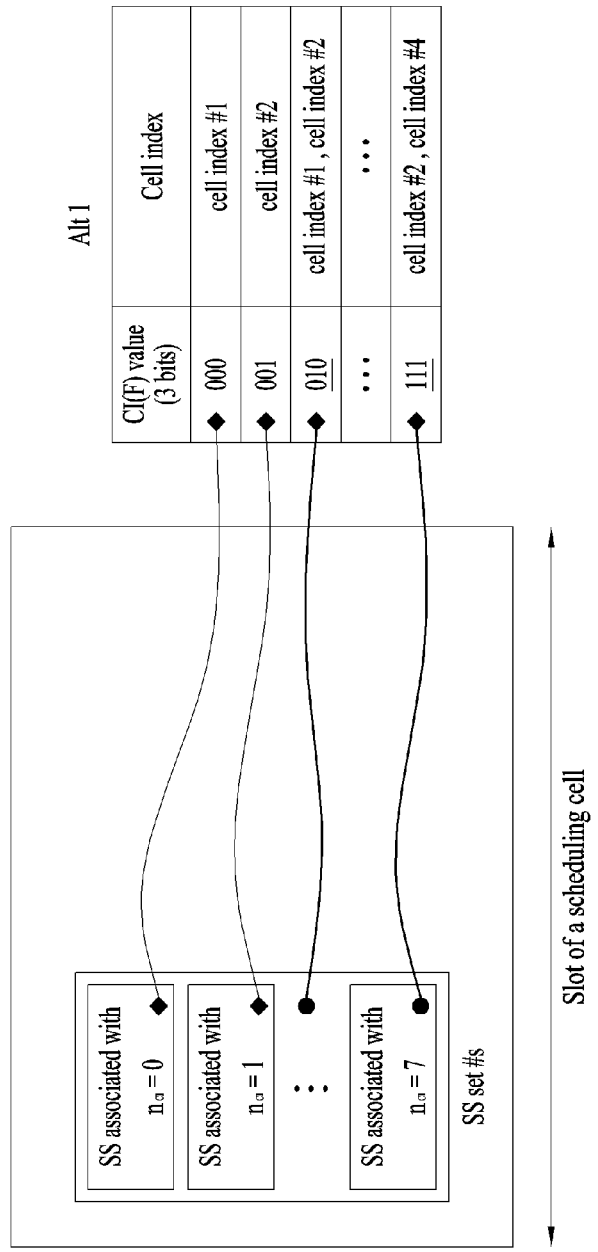
Figure 13:
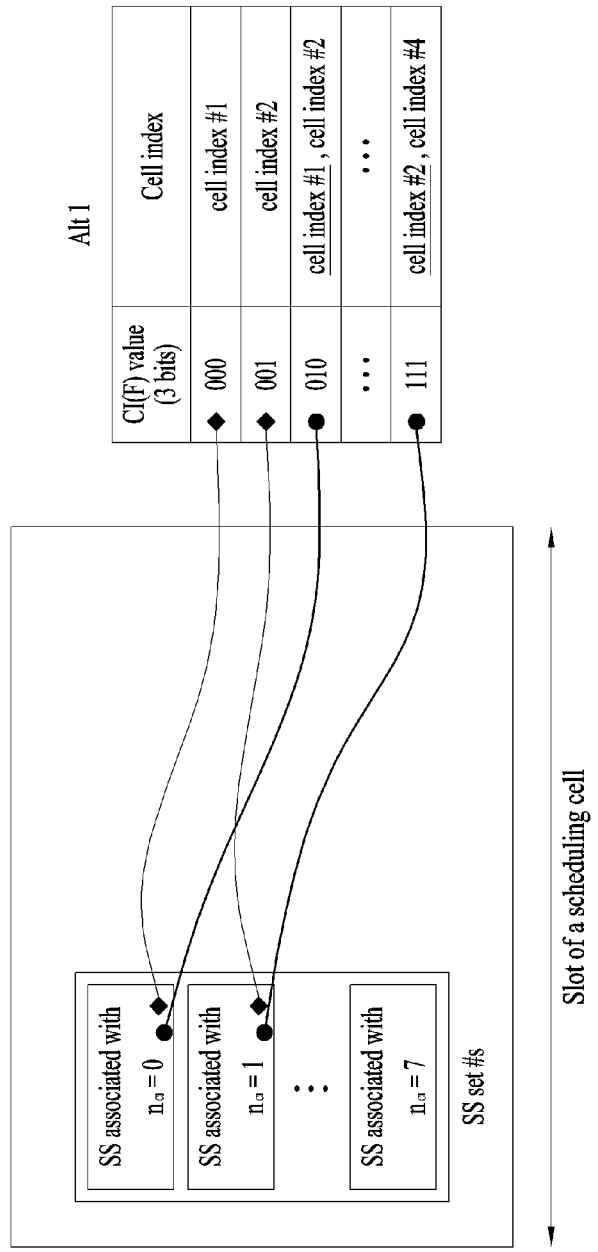

In addition to the above-described methods, various methods proposed in the present disclosure may be combined and used in the signal transmission process of FIG. 11. For example, when performing the operation of FIG. 11, the operations of Ala and Alt2 shown in Methods #2 and #3 may be performed. FIG. 12 shows an exemplary case in which Alt1 is applied to Method #3, and FIG. 13 shows an exemplary case in which Alt2 is applied to Method #3. Referring to FIGS. 12 and 13, Alt1) the CI value is set to $n_{CI}$ without change so that a PDCCH candidate can be determined based on the $n_{CI}$ value, and Alt2) a minimum CI value from among the CI values configured for single-cell scheduling purposes corresponding to the cell index(es) associated with the CI value is set to $n_{CI}$ so that a PDCCH candidate can be determined based on the no value.

Various descriptions, functions, procedures, proposals, methods, and/or operational flow charts of the present disclosure may be applied to, but not limited to, various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

According to the present disclosure, at least one memory (e.g., 104 or 204) may store instructions or programs which, when executed, cause at least one processor operably coupled to the at least one memory to perform operations according to various embodiments or implementations of the present disclosure.

According to the present disclosure, a computer-readable storage medium may store at least one instruction or computer program which, when executed by at least one processor, cause the at least one processor to perform operations according to various embodiments or implementations of the present disclosure.

According to the present disclosure, a computer program is stored in at least one computer readable (non-volatile) storage medium, and may include program code that, when executed, performs operations (by the at least one processor) according to some embodiments or implementations of the present disclosure. The computer program may be provided in the form of a computer program product. The computer program product may include at least one computer-readable (non-volatile) storage medium. The computer-readable storage medium may include program code that, when executed, performs operations (by the at least one processor) according to some embodiments or implementations of the present disclosure.

According to various embodiments of the present disclosure, a processing device or apparatus may include the at least one processor and at least one computer memory connected to the at least one processor. The at least one computer memory may store instructions or programs which, when executed, cause the at least one processor operably coupled to the at least one memory to perform operations according to various embodiments or implementations of the present disclosure.

A communication device according to the present disclosure may include at least one processor, and at least one computer memory operatively connected to the at least one processor, and configured to store instructions such that the at least one processor performs specific operations by executing the instructions.

Figure 14:
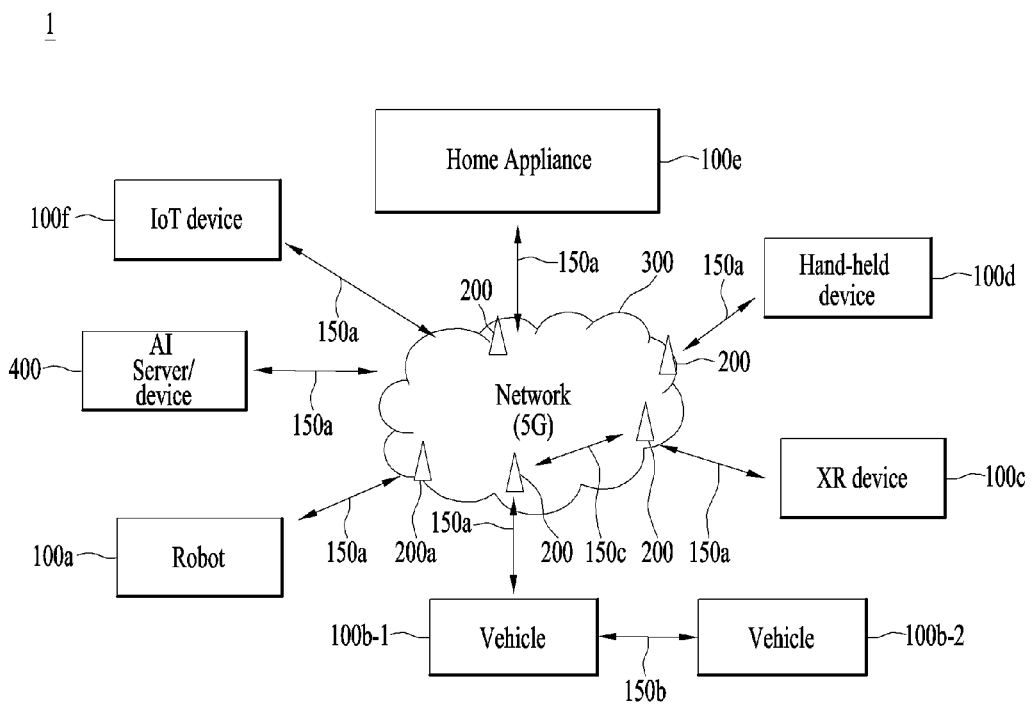
FIGS. 14 to 17 illustrate a communication system 1 and wireless devices applied to the present disclosure.

FIG. 14 illustrates a communication system 1 applied to the present disclosure.

Referring to FIG. 14, a communication system 1l applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
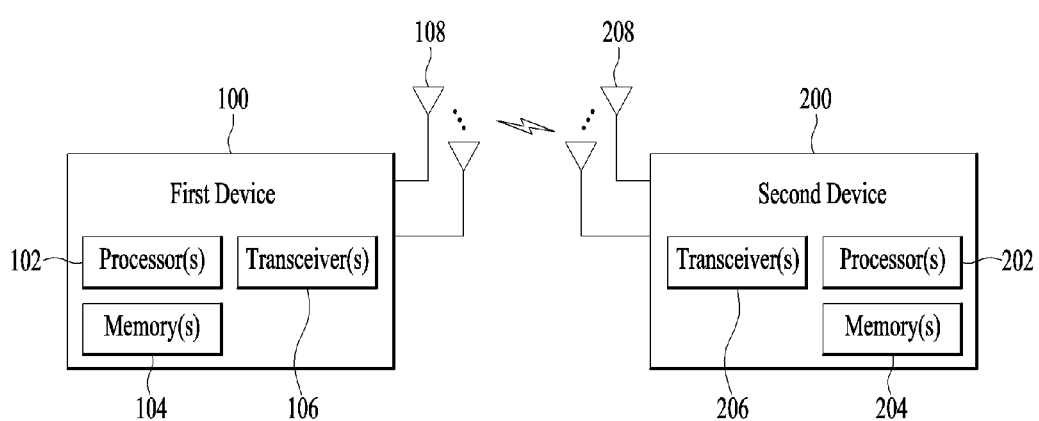

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 02 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
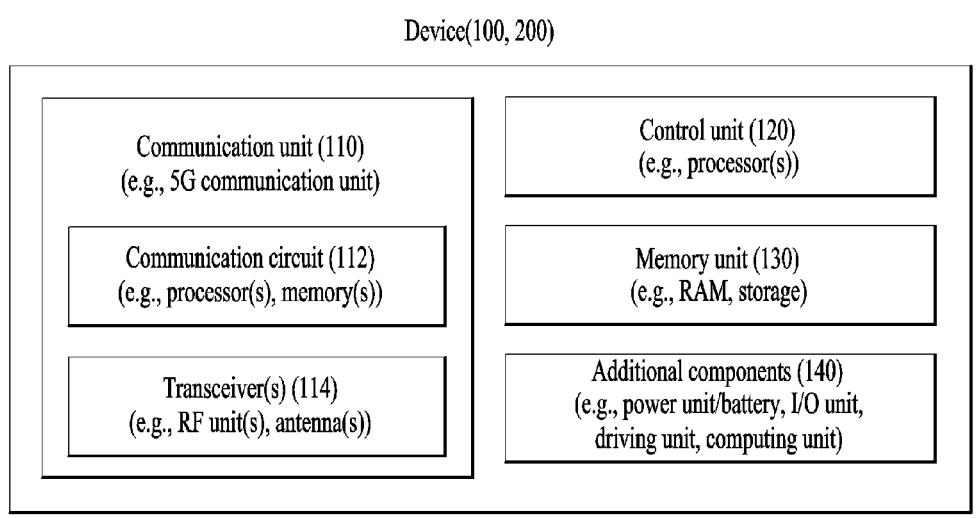

FIG. 16 illustrates another example of a wireless device applied to the present disclosure. The wireless device may be implemented in various forms according to a use-case/service (refer to FIG. 10).

Referring to FIG. 16, wireless devices 100 and 200 may correspond to the wireless devices 100 and 200 of FIG. 11 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 10), the vehicles (100b-1 and 100b-2 of FIG. 10), the XR device (100c of FIG. 10), the hand-held device (100d of FIG. 10), the home appliance (100e of FIG. 10), the IoT device (100f of FIG. 10), a digital broadcast terminal, a hologram device, a public safety device, an MTC device, a medicine device, a fintech device (or a finance device), a security device, a climate/environment device, the AI server/device (400 of FIG. 10), the BSs (200 of FIG. 10), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors.

As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
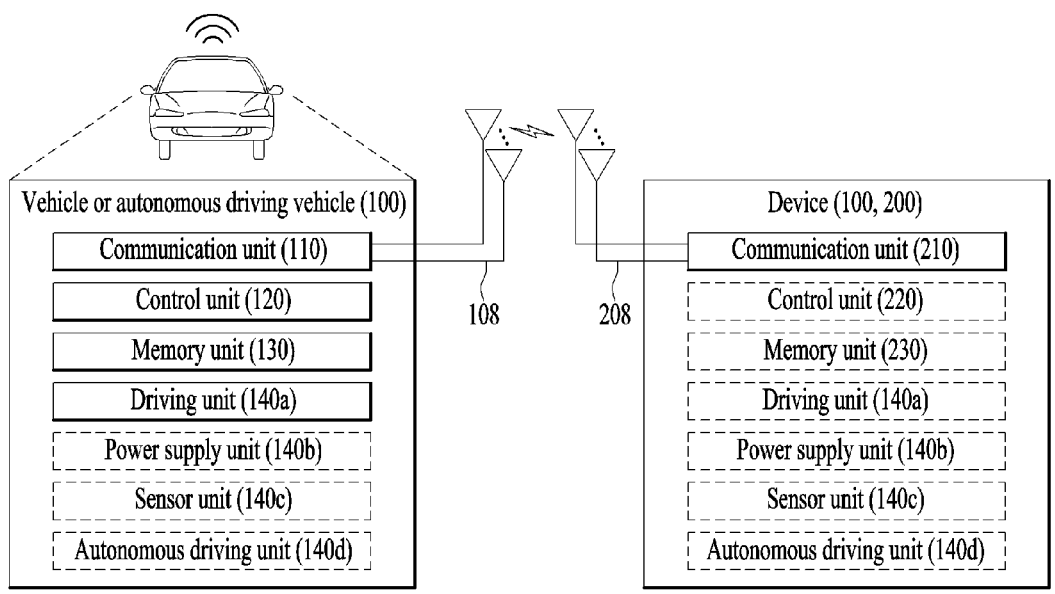

FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

The invention claimed is:

1. A method of performing communication by a user equipment (UE) in a wireless communication system, the method comprising:
   monitoring, by the UE, a plurality of physical downlink control channel (PDCCH) candidates;
   decoding, by the UE, DCI (Downlink Control Information);
   determining, by the UE, one or more scheduled cells based on the DCI; and
   transmitting, by the UE, a PUSCH (Physical Uplink Shared Channel) in the one or more scheduled cells,
   wherein the one or more scheduled cells are determined by a field in the DCI,
   wherein a length of the field is based on a number of entries,
   wherein the entries include combinations of scheduled cells for Uplink scheduling.

2. The method according to claim 1, wherein the field is ceiling [log 2 (the number of entries)] bits.

3. A user equipment (UE) used in a wireless communication system, the UE comprising:
   at least one radio frequency (RF) unit;
   at least one processor; and
   at least one computer memory operably connectable to the at least one processor and storing instructions that, when executed, cause the at least one processor perform operations comprising:

monitoring a plurality of physical downlink control channel (PDCCH) candidates;

decoding DCI (Downlink Control Information);

determining one or more scheduled cells based on the DCI; and transmitting a PUSCH (Physical Uplink Shared Channel) in the one or more scheduled cells, wherein the one or more scheduled cells are determined by a field in the DCI, wherein a length of the field is based on a number of entries, wherein the entries include combinations of scheduled cells for Uplink scheduling.

4. The UE according to claim 3, wherein the field is ceiling [log 2 (the number of entries)] bits.

5. A non-transitory computer-readable storage medium configured to store instructions that, when executed, cause at least one processor to perform operations comprising:

monitoring a plurality of physical downlink control channel (PDCCH) candidates;

decoding DCI (Downlink Control Information);

determining one or more scheduled cells based on the DCI; and transmitting a PUSCH (Physical Uplink Shared Channel) in the one or more scheduled cells, wherein the one or more scheduled cells are determined by a field in the DCI, wherein a length of the field is based on a number of entries, wherein the entries include combinations of scheduled cells for Uplink scheduling.

* * * * *